(12) United States Patent
Shasha

(10) Patent No.: US 11,689,372 B2
(45) Date of Patent: Jun. 27, 2023

(54) SECURE, ENERGY-EFFICIENT PUBLIC BLOCKCHAIN

(71) Applicant: Dennis E. Shasha, New York, NY (US)

(72) Inventor: Dennis E. Shasha, New York, NY (US)

(73) Assignee: New York University, New York, NY (US)

( * ) Notice: Subject to any disclaimer, the term of this patent is extended or adjusted under 35 U.S.C. 154(b) by 672 days.

(21) Appl. No.: 16/732,852

(22) Filed: Jan. 2, 2020

(65) Prior Publication Data
US 2020/0220732 A1  Jul. 9, 2020

Related U.S. Application Data

(60) Provisional application No. 62/788,476, filed on Jan. 4, 2019.

(51) Int. Cl.
*H04B 7/185* (2006.01)
*H04L 9/32* (2006.01)
*G06Q 10/087* (2023.01)

(52) U.S. Cl.
CPC ......... *H04L 9/3247* (2013.01); *G06Q 10/087* (2013.01); *H04B 7/18526* (2013.01); *H04L 2209/30* (2013.01)

(58) Field of Classification Search
CPC ..... H04L 9/3247; H04L 2209/30; H04L 9/32; G06Q 10/087; H04B 7/02; H04B 7/185; H04B 7/18526
See application file for complete search history.

(56) References Cited

U.S. PATENT DOCUMENTS

| 10,742,313 | B1* | 8/2020 | Favarolo | G06F 9/505 |
| 2020/0028908 | A1* | 1/2020 | Coleman | H04L 67/12 |
| 2021/0344409 | A1* | 11/2021 | Schloemer | H04B 7/1856 |

* cited by examiner

*Primary Examiner* — Blane J Jackson
(74) *Attorney, Agent, or Firm* — Ansel M. Schwartz

(57) ABSTRACT

The basic idea of this invention is to send one or more cubesats into orbit, each equipped with a hardware security module. Users would send their transaction to the cubesats which would collect them into blocks, sign them, and send (bounce) them back to earth (and to one another). Bounce Blockchain provides scalability through sharding (transactions will be partitioned over cubesats). Because modern hardware security modules are tamper-resistant (become inoperable if tampered with) or tamper-responsive (erase their keys if tampered with), take their keys from physical processes, and have been validated, socio-technical protocols can ensure that it is infeasible to forge the identity of a hardware security module in a cubesat with another cubesat. If, however, some cubesats are destroyed, the blockchain will continue to execute correctly though some transactions will be lost. New cubesats can be sent up in short order as they are quite cheap to launch. If, in spite of these assurances, some cubesats fail traitorously, the blockchain can survive through algorithms similar to Practical Byzantine Fault Tolerance techniques.

23 Claims, 11 Drawing Sheets

SECURE, ENERGY-EFFICIENT PUBLIC BLOCKCHAIN

CROSS-REFERENCE TO RELATED APPLICATIONS

This is a non-provisional of U.S. provisional application Ser. No. 62/788,476 filed Jan. 4, 2019, incorporated by reference herein.

FIELD OF THE INVENTION

The present invention is related to the maintenance of the integrity of a blockchain at little cost in energy while ensuring reliability in any reasonable circumstances. (As used herein, references to the "present invention" or "invention" relate to exemplary embodiments and not necessarily to every embodiment encompassed by the appended claims.), More specifically, the present is related to the maintenance of the integrity of a blockchain at little cost in energy while ensuring reliability in any reasonable circumstances by using at least one satellite.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Performing proof-of-work for the Bitcoin blockchain currently requires as much electricity as consumed by the country of Denmark. This enormous energy expenditure translates into higher costs for users (on the order of $US 6.00 or more) and is frankly ecologically irresponsible. As of this writing, it can be subverted (i.e. the blockchain can be forked) by a collusion attack of just a handful of data centers. This invention presents the design of a cheap (less than $US 0.01 per transaction), essentially energy-free public blockchain called a Bounce Blockchain which cannot be forked in any reasonable failure scenario, even most Byzantine failure scenarios.

BRIEF SUMMARY OF THE INVENTION

The essential functionality of a blockchain is to provide a single, immutable history of all relevant transactions. Here the word "single" (or "unforked") means that if agent A sees a block of transactions b1 before b2 in the history (or "blockchain") than any other agent B will see that same relationship in the history. The word "immutable" means that once b1 and b2 are in the history, they will remain in the history and their order will remain the same as well.

Because controlling the order of blocks or the ability to fork a blockchain is potentially very profitable, an algorithm that ensures that a blockchain is unforked must address the potential of malicious agents.

There are two main approaches to ensuring that a blockchain is unforked: (i) "permissionless" (or "decentralized") in which anyone can potentially add blocks to the blockchain or (ii) "permissioned" in which only certain pre-selected agents are allowed to do so. Each in turn is discussed.

When any agent can potentially decide on the order of the blocks, there are three popular methods:

1. Proof of work in which the solution to a computationally difficult problem determines the right to put a block on the blockchain. That is the idea behind the original Bitcoin protocol.
   That approach is not secure if a few agents control most of the computing power as happens to be the case as of this writing [reference Roubini 2018].
2. Proof-of-stake in which those agents with the most interest in a currency can determine what the next block is by some kind of voting mechanism. The trouble with such schemes is that a bad agent Y may flood the system with allies (Sybils) who will vote the way Y wants. Even if this requires some investment as in Algorand [reference Chen et al. 2018], it's certainly worthwhile to pay say 34% of the value of a currency to control the currency.
3. Proof-of-elapsed-time in which a trusted computing platform (e.g. Intel's SGX) is used to run a timer that determines when an agent can place a block. Such a scheme offers the benefit of minimal energy consumption. Unfortunately, it also offers the potential that a single machine whose trusted computing core has been compromised can determine the order of the entire blockchain history. There have already been several successful attacks on SGX [references Bruce Schneier 2017, 2018], suggesting its general vulnerability given an attacker's sufficient time and resources.

Permissioned (Centralized or Semi-Centralized) Approaches

At the opposite extreme to decentralized, distributed, and permissionless control is to centralize control and the point of trust into a central bank [reference Danezis and Meikeljohn].

This avoids a large electrical outlay, but makes strong assumptions about the correctness of the central bank controller. Further, the central bank scheme restricts use to monetary transactions controlled by the central bank, whereas all kinds of blockchain applications might want to be allowed without a central arbiter to determine which transactions belong on the blockchain.

Most permissioned blockchains are based on the Hyperledger Framework [reference Linux 2017]. These avoid proof-of-work while supporting a variety of consensus mechanisms, where the consensus is determined by a set of well-known and semi-trusted agents rather than a single one. For example, Hyperledger offers a variety of consensus mechanisms: (i) Kafka in which a leader orders transactions which is tolerant to fail-crash (also known as fail-stop) failures but not fail-traitorous (also known as Byzantine) failures (ii) Redundant Byzantine Fault Tolerance [reference Aublin et al. 2013] (iii) and trusted computing environment-based systems (e.g. based on Intel's SGX).

The Bounce Blockchain approach is a permissioned protocol that could, for example, be used to support the Hyperledger though the protocols are aimed at general blockchain applications rather than multi-enterprise semi-integrated applications. A detailed comparison is given of Bounce Blockchain with the Practical Byzantine Fault Tolerance-style protocols (the most fault-tolerant and general purpose of the Hyperledger protocols) in a later section.

Briefly, though, the main advantage of the Bounce Blockchain is that it can tolerate more traitorous failures among the ground-based stations in the likely case that the satellite assets are non-traitorous and imposter-free.

The present invention pertains to a system to determine an order among blocks in a blockchain. The system comprises at least one satellite. The system comprises a communications infrastructure in communication with the one satellite. The system comprises sending stations in communication with the communications infrastructure. The system comprises listening stations in communication with the communications infrastructure; wherein (i) a sending station of the plurality of sending stations assembles a block comprising of at least one transaction and a digest of all previous blocks and assembles a representation of the block, (ii) the sending station sends the representation of the block to the one satellite, (iii) the one satellite modifies said representation by an indication of an identity of said one satellite to form a modified representation and sends the modified representation to at least one listening station through the communications infrastructure, (iv) the plurality of listening stations through the communications infrastructure engage in a protocol stored in each of the plurality of listening stations to ensure that the modified representation contains the indication of the satellite's identity, and the modified representation of the block and the block are in agreement.

The present invention pertains to a method to determine an order among blocks in a blockchain. The method comprises the steps of (i) sending a representation of at least one transaction from one sending station of a plurality of sending stations through a communications infrastructure to a satellite in communication with the communications infrastructure. There is the step of (ii) incorporating the one transaction into a block by the satellite. There is the step of (iii) sending the block to at least one listening station of a plurality listening stations. There is the stuff of in (iv) using a communication protocol involving at least a plurality of the plurality of listening stations to determine a next block to put onto the blockchain without the need for proof of work or proof of stake.

The present invention pertains to a satellite to determine an order among blocks in a blockchain. The satellite comprises a receiver for receiving information about at least one block b1 consisting of at least one transaction from a sending station. The satellite comprises a non-transient storage medium in which the information about the one block is stored. The storage medium in communication with the receiver. The satellite comprises a transmitter. The satellite comprises a computer which accumulates the one or more transactions into a block b1, signs and sends the block b1 to at least one Listening Station L1 via the transmitter. The computer in communication with the transmitter and the storage medium. The one listening station L1 and the sending station remote from the satellite.

The present invention pertains to a sending station to determine an order among blocks in a blockchain. The sending station comprises a non-transient storage medium in which a block is stored. The sending station comprises a transmitter. The sending station comprises a computer which creates a Merkle Tree for the block b wherein said block b includes a hash of a root of a Merkle Tree of the previous block in the blockchain. The computer signs a hash of the root of said Merkle Tree of block b to create a signed hash of the root, and sends the signed hash with the transmitter to a satellite. The transmitter and the storage medium in communication with the computer.

The present invention pertains to a listening station L1 to determine an order among blocks in a blockchain. The listening station comprises a receiver for receiving information about the blocks from a satellite. The listening station comprises a non-transient storage medium which stores the information about at least one block. The storage medium in communication with the receiver. The listening station comprises a transmitter. The listening station comprises a computer which sends the information about the blocks to at least one other listening station L2 which is remote from listening station L1 via the transmitter. The computer in communication with the storage medium, the receiver and the storage medium.

The present invention pertains to a non-transitory readable storage medium which includes a computer program stored on the storage medium for determining an order among blocks in a blockchain. The computer program has the computer-generated steps of receiving by a receiver of a satellite a representation of least one block b comprising at least one transaction from a sending station. There is the step of storing in the storage medium of the satellite the representation of the one block b. The storage medium in communication with the receiver. There is the step of signing and sending said representation of the one block b to at least one Listening Station L1 via a transmitter of the satellite in communication with the storage medium, the one listening station L1 and the sending station remote from the satellite.

The present invention pertains to a non-transitory readable storage medium which includes a computer program stored on the storage medium for determining an order among blocks in a blockchain. The computer program has the computer generated steps of storing in the storage medium of a sending station a previous block. There is the step of creating a Merkle Tree for a block b wherein said block b includes a hash of a root of a Merkle Tree of the previous block in the blockchain. There is the step of signing a hash of the root of said Merkle Tree of block b to create a signed hash of the root. There is the step of sending the signed hash with a transmitter of the sending station to a satellite. The transmitter and the storage medium in communication with the computer of the sending station.

The present invention pertains to a non-transitory readable storage medium which includes a computer program stored on the storage medium for determining an order among blocks in a blockchain. The computer program has the computer-generated steps of receiving a representation of the blocks by a receiver of a listening station L1 from a satellite. There is the step of storing the representation of the blocks in the storage medium of the listening station L1. The storage medium in communication with the receiver. There is the step of sending the representation of the blocks to at least one other listening station L2 which is remote from listening station L1 via a transmitter of the listening station L1. The computer of the listening station L1 in communication with the storage medium, the receiver and the transmitter.

The present invention pertains to a system using a blockchain to track diamonds to ensure that each diamond d was legally mined and that diamond d has not been replaced by another as diamond d is delivered to an end seller. The system comprises a sending station s which assembles a block b containing transaction t at some epoch e, transaction t having a photograph of diamond d each time diamond d transfers from one entity to a next entity as well as any transfer documents encoded into transaction t. The sending station computing a Merkle Tree for block b, signs a hash of a root of the Merkle Tree yielding a message sgns(hash(root (b)). The system comprises a Cubesat c. The sending station sends the message $sgn_s(hash(root(b)))$, which is called block (c,e) in a protocol, Cubesat c signs the message as $sgn_c$(block(, e)). The system comprises Listening Stations. The Cubesat c sends $sgn_c$(block(c,e)) to the Listening Stations. The Listening Stations sends the signed message $sgn_c$(block (c,e)) among themselves. If a supermajority (more than $\frac{2}{3}$)

of the Listening Stations agree on the block b, then block b becomes part of the block chain.

DETAILED DESCRIPTION OF THE INVENTION

Figure 1:
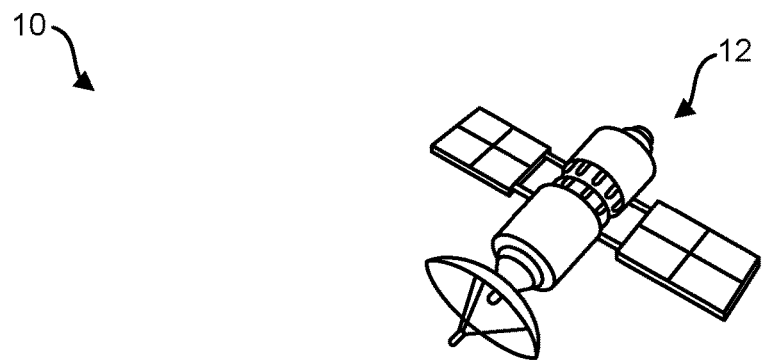
FIG. 1 is a figure showing an idealized Bounce Blockchain configuration in which a perfectly reliable satellite orders transactions and re-transmits them to all listeners.
Figure 1:
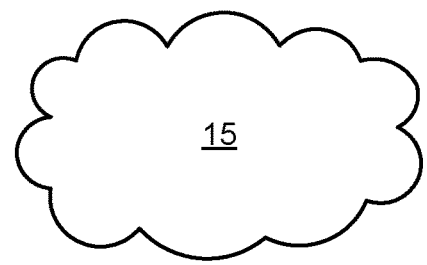
Figure 1:
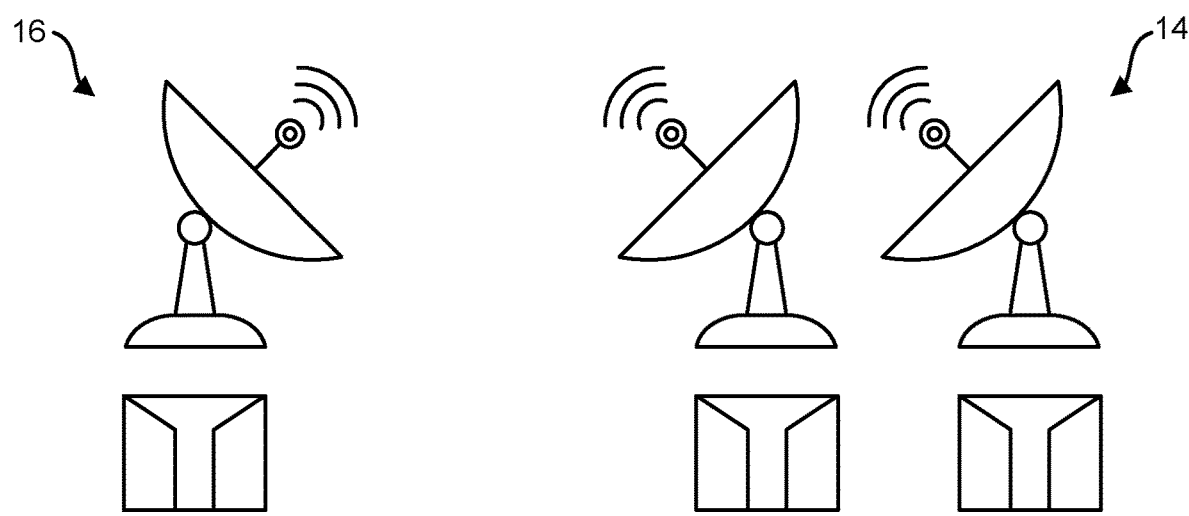

Referring now to the drawings wherein like reference numerals refer to similar or identical parts throughout the several views, and more specifically to FIG. 1 thereof, there is shown system 10 to determine an order among blocks in a blockchain. The system 10 comprises at least one satellite 12. The system 10 comprises a communications infrastructure 15 in communication with the one satellite 12. The system 10 comprises sending stations 16 in communication with the communications infrastructure 15. The system 10 comprises listening stations 14 in communication with the communications infrastructure 15; wherein (i) a sending station 16 of the plurality of sending stations 16 assembles a block comprising of at least one transaction and a digest of all previous blocks and assembles a representation of the block, (ii) the sending station 16 sends the representation of the block to the one satellite 12, (iii) the one satellite 12 modifies said representation by an indication of an identity of said one satellite 12 to form a modified representation and sends the modified representation to at least one listening station 14 through the communications infrastructure 15, (iv) the plurality of listening stations 14 through the communications infrastructure 15 engage in a protocol stored in each of the plurality of listening stations 14 to ensure that the modified representation contains the indication of the satellite's 12 identity, and the modified representation of the block and the block are in agreement.

The indication of the identity, of the one satellite 12 may include the digital signature of the satellite 12. The satellite 12 may digitally sign the representation of the block the satellite 12 sends to the at least one listening station 14. The communication protocol may include the sending of signed messages from one listening station 14 to another.

The present invention pertains to a method to determine an order among blocks in a blockchain. The method comprises the steps of (i) sending a representation of at least one transaction from one sending station 16 of a plurality of sending stations 16 through a communications infrastructure 15 to a satellite 12 in communication with the communications infrastructure 15. There is the step of (ii) incorporating the one transaction into a block by the satellite 12. There is the step of (iii) sending the block to at least one listening station 14 of a plurality listening stations 14. There is the step of (iv) using a communication protocol involving at least a plurality of the plurality of listening stations 14 to determine a next block to put onto the blockchain without the need for proof of work or proof of stake.

Figure 9:
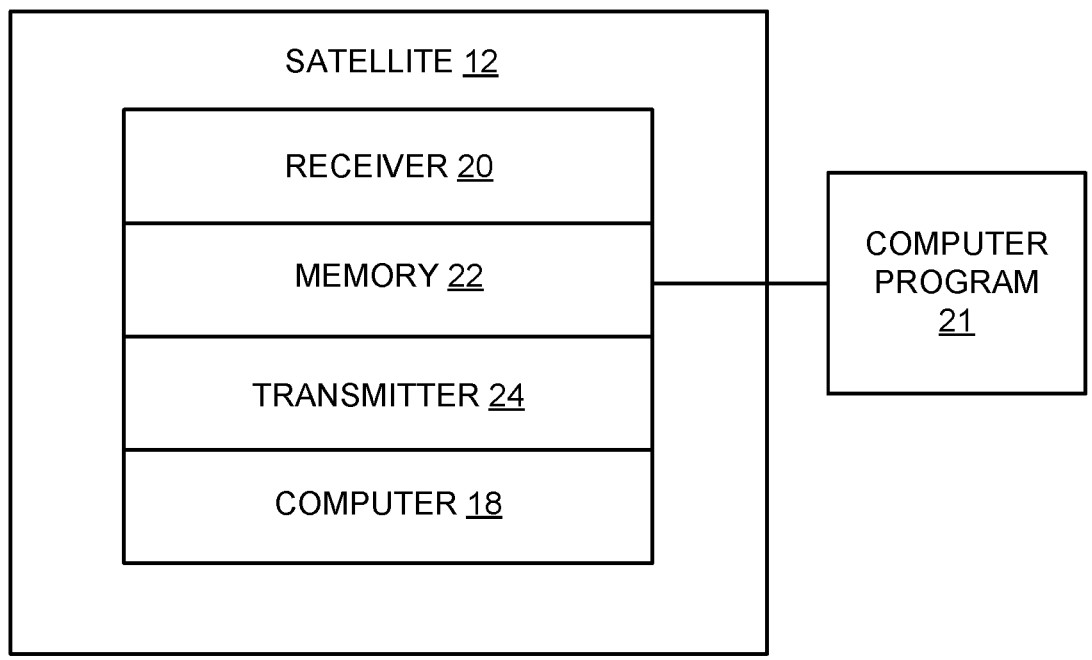
FIG. 9 is a block diagram regarding a satellite.

The present invention pertains to a satellite 12 to determine an order among blocks in a blockchain, as shown in FIG. 9. The satellite 12 comprises a receiver 20 for receiving information about at least one block b1 consisting of at least one transaction from a sending station 16. The satellite 12 comprises a non-transient storage medium 22 in which the information about the one block is stored. The storage medium 22 in communication with the receiver 20. The satellite 12 comprises a transmitter 24. The satellite 12 comprises a computer 18 which accumulates the one or more transactions into a block b1, signs and sends the block b1 to at least one Listening Station 14 L1 via the transmitter 24, and preferably signs and sends a digest of said block b1 to at least one other satellite via the transmitter. The computer 18 in communication with the transmitter 24 and the storage medium 22. The other satellite 12 and the one listening station 14 L1 and the sending station 16 remote from the satellite 12.

Figure 10:
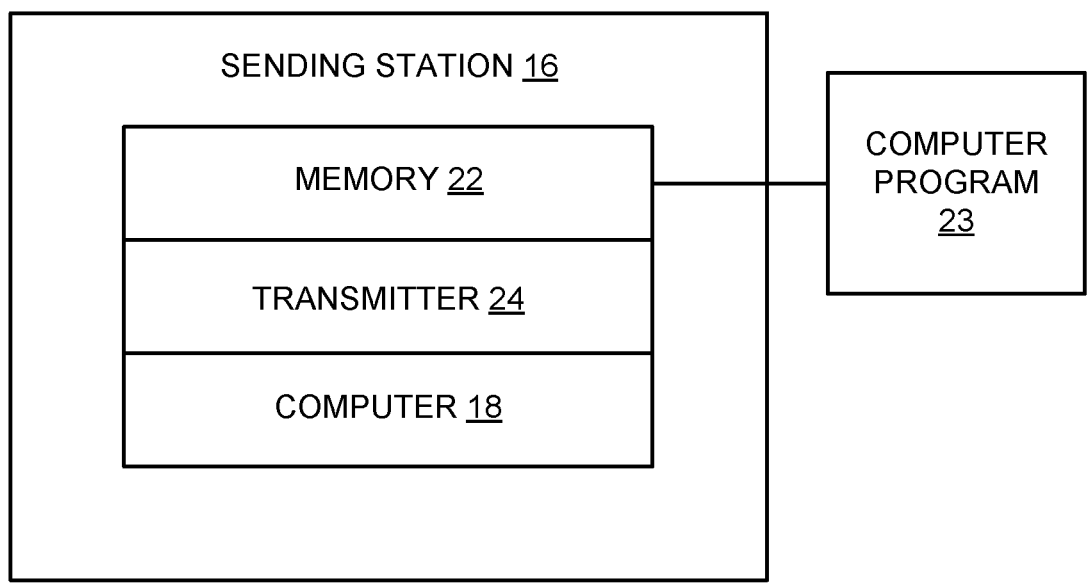
FIG. 10 is a block diagram regarding a sending station.

The present invention pertains to a sending station 16 to determine an order among blocks in a blockchain, as shown in FIG. 10. The sending station 10 comprises a non-transient storage medium 22 in which a previous block is stored. The sending station 16 comprises a transmitter 24. The sending station 16 comprises a computer 18 which creates a Merkle Tree for the block b wherein said block b includes a hash of a root of a Merkle Tree of the previous block in the blockchain. The computer 18 signs a hash of the root of said Merkle Tree of block b to create a signed hash of the root, and sends the signed hash with the transmitter 24 to a satellite 12. The transmitter 24 and the storage medium 22 in communication with the computer 18.

Figure 11:
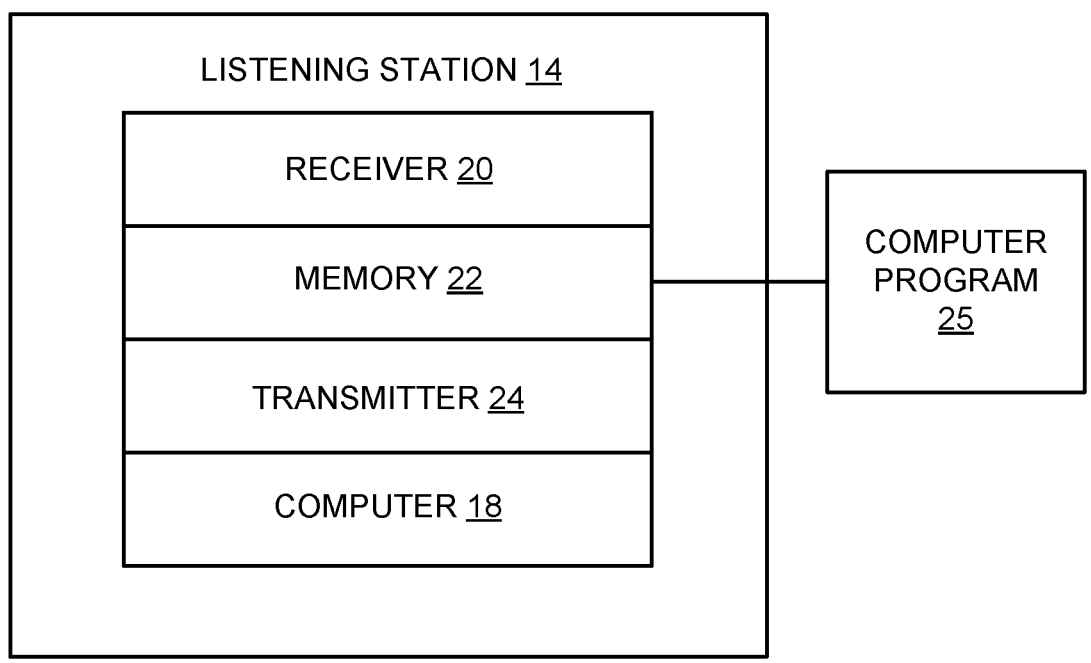
FIG. 11 is a block diagram regarding a listening station.

The present invention pertains to a listening station 14 L1 to determine an order among blocks in a blockchain, as shown in FIG. 11. The listening station 14 comprises a receiver 20 for receiving information about the blocks from a satellite 12. The listening station 14 comprises a non-transient storage medium 22 which stores the information about the blocks. The storage medium in communication with the receiver 20. The listening station 14 comprises a transmitter 24. The listening station 14 comprises a computer 18 which sends the information about the blocks to at least one other listening station 14 L2 which is remote from listening station 14 L1 via the transmitter 24. The computer 18 in communication with the storage medium 22, the receiver 20 and the transmitter 24.

The present invention pertains to a non-transitory readable storage medium 22 which includes a computer program 21 stored on the storage medium 22 for determining an order among blocks in a blockchain, as shown if FIG. 9. The computer program 21 has the computer 18 generated steps of receiving by a receiver 20 of a satellite 12 a representation of least one block b comprising at least one transaction from a sending station 16. There is the step of storing in the storage medium 22 of the satellite 12 the representation of the one block b. The storage medium 22 in communication with the receiver 20. There is the step of signing and sending said representation of the one block b to at least one Listening station 14 L1 via a transmitter 24 of the satellite 12 in communication with the storage medium 22, the one listening station 14 L1 and the sending station 16 remote from the satellite 12.

The present invention pertains to a non-transitory readable storage medium 22 which includes a computer program 23 stored on the storage medium 22 for determining an order among blocks in a blockchain, as shown in FIG. 10. The computer program 23 has the computer 18 generated steps of storing in the storage medium 22 of a sending station 16 a previous block. There is the step of creating a Merkle Tree for a block b wherein said block b includes a hash of a root of a Merkle Tree of the previous block in the blockchain. There is the step of signing a hash of the root of said Merkle Tree of block b to create a signed hash of the root. There is the step of sending the signed hash with a transmitter 24 of the sending station 16 to a satellite 12. The transmitter 24 and the storage medium 22 in communication with the computer 18 of the sending station 16.

The present invention pertains to a non-transitory readable storage medium 22 which includes a computer program 25 stored on the storage medium 22 for determining an order among blocks in a blockchain, as shown in FIG. 11. The computer program 25 has the computer 18 generated steps of receiving a representation of the blocks by a receiver 20 of a listening station 14 L1 from a satellite 12. There is the step of storing the representation of the blocks in the storage medium 22 of the listening station 14 L1. The storage medium 22 in communication with the receiver 20. There is the step of sending the representation of the blocks to at least one other listening station 14 L2 which is remote from listening station 14 L1 via a transmitter 24 of the listening station 14 L1. The computer 18 of the listening station 14 L1 in communication with the storage medium 22, the receiver 20 and the transmitter 24.

The present invention pertains to a system 10 using a blockchain to track diamonds to ensure that each diamond d was legally mined and that diamond d has not been replaced by another diamond as diamond d is delivered to an end seller. The system 10 comprises a sending station 16 $s$ which assembles a block b containing transaction t at some epoch e. Transaction t having a photograph of diamond d each time diamond d transfers from one entity to a next entity as well as any transfer documents encoded into transaction t. The sending station 16 $s$ computing a Merkle Tree for block b, and signs a hash of a root of the Merkle Tree yielding a message sgns(hash(root(b))). The system 10 comprises a Cubesat 12 $c$. The sending station 16 sends the message $sgn_s$(hash(root(b))), which is called block(c,e) in a protocol to the Cubesat 12 $c$. Cubesat 12 $c$ signs the message as $sgn_c$(block(,e)). The system comprises Listening Stations 14. The Cubesat 12 $c$ sends $sgn_c$(block(c,e)) to the Listening Stations 14. The Listening Stations 14 send the signed message $sgn_c$(block(c,e)) among themselves. If a supermajority (more than ⅔) of the Listening Stations 14 agree on the block b, then block b becomes part of the block chain.

Bounce Blockchain—Basic Principles

Bounce Blockchain uses space to create a hard-to-touch chain arbiter. In its simplest idealized form, the Bounce Blockchain consists of a single satellite 12 that receives transactions, orders them, and sends them back to earth. The arbiter give preference to no ground-based agent regardless of that agent's wealth or computational power. See FIG. 1.

While the single satellite 12 case enjoys no fault tolerance, the actual implementation(s) of Bounce Blockchain supports a blockchain that, under even quite extreme failure models, guarantees that the validated collection of blocks has no forks. Bounce Blockchain does this with low latency and negligible energy cost.

Bounce Blockchain achieves nothing else, e.g. it doesn't prevent double-spending in Bitcoin. Indeed, the Bounce Blockchain framework is completely orthogonal to the functionality of the transactions. For example, any agent can execute a transaction containing a smart contract when the appropriate inputs are available on the blockchain. To justify the execution of some contract (or to demonstrate double-spending), one can consult the blockchain itself.

Blockchains in Space

Before continuing a discussion of Bounce Blockchain, other applications of space to support blockchains are considered.

The SpaceChain [reference Spacechain Foundation 2018] aims to support space exploration by an international and decentralized (i.e., non-governmental) community. SpaceChain puts blockchain nodes in space to support cooperative projects in which contributions can be attributed and time-stamped. The project proposes its own cryptocurrency. It assumes that the Qtum proof of stake scheme to be placed on the space nodes can work without forking. There is no intention of providing blockchain services to others.

FIG. 1 shows an Idealized Bounce Blockchain consists of a perfectly reliable and trustworthy satellite 12 that could receive transactions from anywhere on earth, order them, and send them back. The technical goal of this invention is to achieve this same functionality with failure-prone satellites and other devices, even ones that may fail traitorously.

Blockstream Satellite 12 (https://blockstream.com/satellite/) broadcasts Bitcoin information so that any node can receive the entire transaction history. There is no attempt to add blocks to the blockchain of bitcoin, just to share its history.

Cubesat 12 Economics

Cubesats 12 are 10 cm per side cubes that cost roughly $40,000 to launch into a 25-year orbit at 640 kilometers above the earth's surface. Researchers have already shown how to install Hardware Security Modules inside them [Michalevsky and Winetraub 2017]. As of this writing, for a total cost under $100,000 (including launch and provisioning), each such module can handle roughly one megabit per second. Each of Ethereum and Bitcoin process about 1 million transactions per day or under 20 per second. Assuming a generous 1000 bytes per transaction (8,000 bits), one Cubesat 12 could handle 100 transactions per second. Assuming a lifetime of 20 years and 100 transactions per second, a Cubesat 12 that costs $US 100,000 to install and launch yields a cost per transaction of $US 0.0002, roughly 10,000 times cheaper than a Bitcoin transaction. Because the present architecture requires Sending Stations 16 (to collect fees and send data to the Cubesats 12) and some messaging mechanism using communications satellites 12 (to receive data from Cubesats 12), this cost might climb, but probably by far less than a factor of two. Transponder costs are lower than $US 1,000 per month per megahertz [reference BROADBAND TV NEWS CORRESPONDENT. 2018]. At these prices, it is expected the number of transactions to grow significantly. So, one has to be ready to scale up the number of Cubesats 12 for performance and fault tolerance reasons in the case that the full transactions to the Cubesats are sent. These performance considerations do not arise if just the hash of the root of the Merkle Tree however is sent.

Because each hardware security module will have a different private and public key (because these are generated based on thermal noise for each module separately) [reference Smirnoff 2017], each will have a different private/public key pair. Each module will receive transactions to sign. Provided the Sending Stations 16 choose the appropriate Cubesat 12 more or less uniformly, the load would be divided quite evenly. This form of scaling is called "sharding" in the blockchain literature. In this way, each Cubesat 12 would require roughly a fraction (O(1/k)) of the bandwidth of the entire stream of transactions, if there are k Cubesats 12.

Note that Cubesats 12 with Hardware Security Modules as a concrete example are used.

The basic architecture could work for any system of satellites 12 and security modules. One benefit of Cubesats 12 is that they are cheap to launch, hard to destroy and even harder to capture.

Bounce Blockchain—Preferred Embodiments

Figure 2:
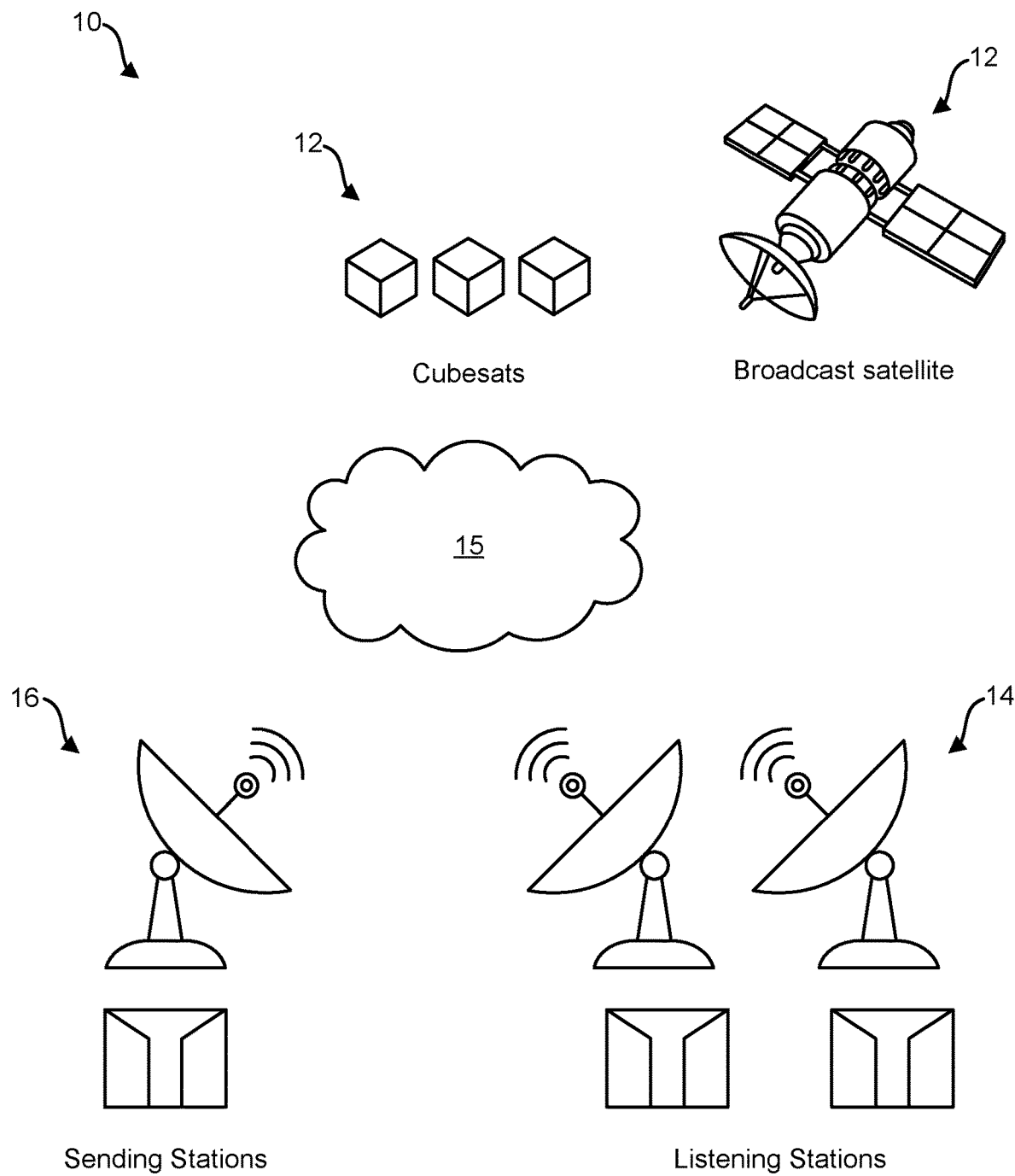
FIG. 2 shows the basic components of the Bounce Blockchain.

Globally, the components of the real Bounce Blockchain system 10 (as opposed to the idealized one) consist of (i) block signing satellites 12, which, for concreteness, will be Cubesats 12, each embedding a hardware security module; (ii) a set of Sending Stations 16 that relay transactions to the Cubesats 12 upon payment of a fee; (iii) a set of Listening Stations 14 that receive messages from the Cubesats 12; and (iv) a communications infrastructure supporting Sending Stations to Cubesat 12, Cubesat 12 to Listening station 14, and Listening station 14 to Listening station 14 communication as shown in FIG. 2. FIG. 2 shows the Bounce Blockchain Components.

Some assumptions are made about the components that come either from underlying technology or the global (and hopefully transparent) governance of this system 10:
1. Assumption: Alert (i.e. correctly working) Cubesats and Listening Stations 14 can keep time to millisecond accuracy. Miniaturized atomic clocks currently cost approximately US$1500 and have an accuracy of $10^{-9}$ seconds per day, so millisecond accuracy is easy to achieve even over a 25 year lifetime.
   Motivation for this assumption: The present protocols will work in synchronous phases.
2. Assumption: The public keys of all Sending Stations 16 are known to the Cubesats 12. Anyone who wishes to submit a transaction must also know the internet or other communication addresses of the Sending Stations 16, just as a consumer must know the address of amazon.com.
   Motivation for this assumption: Consumers route their transactions through Sending Stations 16 to ensure that the transaction fees (modest though they are) are collected and as a disincentive to denial of service attacks. The Cubesats 12 will accept messages only from Sending Stations 16. Further, it is observed that, as long as user transactions are signed by the originating user, Sending Stations 16 can block transactions, but cannot modify them without being detected.
3. The public key and communication address of each Listening station 14 must be known to other Listening Stations 14 and the location of the Listening station 14 must be known to the Cubesats 12.
   Motivation: The Listening Stations 14 themselves must know which Listening Stations 14 to send to and to receive from. The Cubesats 12 must know how to send to all Listening Stations 14.

Note that both Sending Stations 16 and Listening Stations 14 still may fail in both benign (fail-stop) and Byzantine (fail-traitorous) ways, once in operation. It is discussed the guarantees that can be given for these failure models below.

Because the part of the system 10 that is likely to be the most secure are the Cubesats 12 and the hardware security modules they carry, this invention tries to ensure that security through the Lift-Off protocol described next.

Lift-Off Protocol

Cubesats 12 are wanted to be sent into space in a way that prevents them from being spoofed and to prevent them from revealing their keys. The goal is to ensure that Cubesats 12 will be fail-stop, though the present protocols in later sections tolerate Byzantine failures if there are not too many of them.
1. Procure a set of hardware security modules (HSMs) that has been validated based on some national (e.g. NIST) or international validation standards. Each such module should come directly from the manufacturer and, optionally, subsets of the modules should come from different manufacturers.
2. Each of a set of security experts from around the world gather around the launch site possibly to validate the hardware security modules and to supervise their handling. This will not be foolproof, but will raise the bar to fraud.
3. Optional: Some number k more Hardware Security Modules may be shipped than are necessary and the experts can randomly choose (say using a physical tumbler device) k HSMs, break them open and photograph their layers to see that they have the hardware and software that has been validated.
4. The HSMs are loaded into the rocket. TV cameras can also watch the loading. It can be an international event like a SpaceX lift-off.
5. Shortly after lift-off (but far enough from a would-be remote sensor), the HSM generates its private/public key based on a physical process, as is standard.
6. The Sending Stations 16 observe the angle of the lift-off to see if this conforms to the flight plan.
7. All (or some supermajority) of the Sending Stations 16 need to agree on the validity of each Cubesat 12 (they all sign messages and gossip them) for the Cubesat 12 to be validated and for the public keys of those Cubesats 12 to be disseminated. Those Sending Stations 16 then assign a slice to that Cubesat 12. This requires a consensus protocol each time such a launch takes place.
8. The validation message containing the public key of the Cubesat 12 and signed by all agreeing the Sending Stations 16 can be published further, so that the public keys of all validated Cubesats 12 will be common knowledge to the Listening Stations 14 and the Cubesats 12 themselves.

One objection one can give to this design is that this system 10 conveys trust of the Sending Stations 16 who must certify the Cubesats 12 and make their public keys common knowledge. That is true, but this trust is confined to the one or a few lift-off phases. This is called punctuated trust.

Once the Cubesats 12 are deployed and certified, the Sending Stations 16 no longer need to be trusted. The only damage a Sending station 16 can do is to refuse to send a transaction or to send bogus transactions. That is why there are preferably many Sending and Listening Stations 14.

Some Attacks on Cubesat Deployment and Socio-Technical Countermeasures

Consider some possible attacks on the integrity of the Cubesats 12 and their embedded Hardware Security Modules.

1. An adversary predicts the key of a Hardware Security Module (HSM) or steals its key.

Counter-measure: By design, the private key of an HSM is based on a physical process that is unique to the environment of the HSM. Note that large companies use HSMs in their ecommerce platforms and many thieves have every incentive to acquire those private keys, but, as far as it is known, have not. Further, HSMs are designed to be either tamper-resistant (become inoperable if tampered with) or tamper-responsive (erase their keys if tampered with). Further, HSMs on the market are starting to be validated to level 4 of the FIPS 140-2 standard of the U.S. National Institute of Standards and Technology (which ensures tamper-responsiveness). The validation takes place in independent labs and consists of implementation-level testing [reference Easter, 2006]. Assuming those results are believed, even if a hypothetical space force team were able to capture a Cubesat 12 once in orbit, they would not obtain the keys.

2. The key is stolen anyway. Directional counter-measure:

a) If some agent claims to be in possession of a Cubesat's public key, then that agent's transmissions should come from space. b) The transmission can be made to be continuous from takeoff to deployment. A variety of semi-trusted Sending Stations 16 could sign the lift-off messages and then later the blocks saying "I attest to having received this message from this angle." Between the angle of lift-off and the sequence of numbers sent and the angle in space, it would be difficult at best for a third party to substitute a new Cubesat 12 for one that had just been sent.

3. In spite of the socio-technical efforts listed above, an adversary Cubesat a has the private key of a Cubesat c and can send messages that are indistinguishable from c to all other Cubesats and to Listening Stations 14? Answer: The present protocols tolerate all fail-stop and most traitorous failure scenarios, as is demonstrated below.

Bounce Blockchain Protocols

This section presents two protocols to support the Bounce Blockchain. Neither of these protocols require the solution to any proof-of-work style puzzles. They do use cryptography but only to sign messages.

Basic Definitions

Definition: A Cubesat 12 (respectively, a Listening station 14) is said to be alert during a period of time (or simply "alert" if the time is clear), if it follows the protocol during that time.

Definition: The possible failure modes of a Cubesat 12 or Listening station 14 device D are:

fail-traitorous: if D can act in arbitrarily hostile ways except that it can't forge the digital signature of another agent.

fail-stop: if device D either follows the protocol or stops execution.

Even if a device is in good working order, there is the possibility that another device can impersonate it.

Definition: Device D' is said to impersonate D if D' knows the private key of D and can forge the signature of D. In such a case D is said to have an imposter.

An impersonation can be made of a Cubesat 12 technically more difficult by requiring the Listening Stations 14 to orient their reception to the expected location of the sending Cubesats 12. This would force a would-be imposter to position itself near the Cubesat 12 that the imposter wanted to impersonate.

Definition: An alert device (either Cubesat 12 or Listening station 14) has send-to-all capability if it can send a message to every alert Listening Device. This does not need to be a single broadcast.

Remark: The practical difference between send-to-all and broadcast is that broadcast would imply that even traitorous devices would have to send to every alert Listening Device. Send-to-all requires only that alert devices must do so. This case is considered in a later subsection.

Definition: A supermajority of the set $L_{all}$ of Listening Stations 14 is a subset of size greater than $\frac{2}{3} \times |L_{all}|$.

Individualistic Cubesat Protocol

In this protocol, each Cubesat 12 will, in turn, act like the primary in Practical Byzantine Fault Tolerance [reference Castro and Liskov, 1999]. The benefit of that approach is that the Cubesat 12 is less likely to be fail-traitorous because of its inaccessibility. An issue with this approach is that it requires extensive communication among Listening Stations 14 each time a Cubesat 12 sends its block. This is rectified in the second protocol.

In this simple synchronous version of the protocol, time is divided into epochs, a time period during which every Cubesat 12 receives transactions, formulates them into a block, and then sends the signed block to every Listening station 14. So, in an epoch, every alert Cubesat 12 sends its signed block.

1. All-Cubesat Step.

Set-Up Phase. (i) A user u wishing to send a transaction T in epoch e signs (T,e) and sends $sgn_u((T,e))$ to some Sending Station s with a good reputation.

(ii) Sending Station s signs and sends $sgn_s(sgn_u((T,e)))$ (perhaps along with other transactions) to any Cubesat 12 validated in the lift-off protocol.

(iii) The Cubesats will send in turn. In the simplest case, each Cubesat c that has been validated in the lift-off protocol will be assigned time slice slice(c) within each "epoch" e. If there are k Cubesats, then each one is allotted a slice equal to 1/kth of the epoch.

(iv) At slice(c), Cubesat c creates and signs a block block(c,e) containing the transactions that c has received for epoch e.

2. Listening station 14 Block Gossip Phase: Provided Listening Station L has received a single block $sgn_c$ (block(c,e)) from Cubesat c (and not different signed blocks), L sends to all other Listening Stations 14 a digest of $sgn_c$(block(c,e)), i.e. $sgn_c$(digest($sgn_c$block(c, e))). If L receives inconsistencies from c, then L reports c to special debugging stations along with the evidence. See figure FIG. 6.

3. Listening station 14 Committing Phase: If Listening Station L' receives messages of the form $sgn_L$(digest ($sgn_c$block(c,e))) from Listening Station L and does so from a supermajority of Listening Stations 14 (including L' itself) and does not receive any conflicting digest of a block signed by c, then L' creates a committed block, denoted committed(c,e) consisting of $sgn_c$(block (c,e)) and the digest messages from a supermajority of Listening Stations 14. That block becomes part of the blockchain and is shared with the Sending Stations 16. Otherwise, L' shares $sgn_L$(insufficient(digest($sgn_c$block(c,e)))).

Proposition Individualistic Safety 1: If c is alert and has no imposter, then there can be at most one value of committed(c,e).

Remark: Note that this safety condition holds even if there are many traitorous Listening Stations 14.

Even if c fails traitorously or has an imposter, a supermajority of the Listening Stations 14 can still prevent inconsistent commits using the above protocol, just as in Practical Byzantine Fault Tolerance [reference Castro and Liskov, 1999]. Alternatively, the Listening Stations 14 could use other techniques to resolve Byzantine failures, as are readily understood by those familiar with the state of the art.

Figure 3:
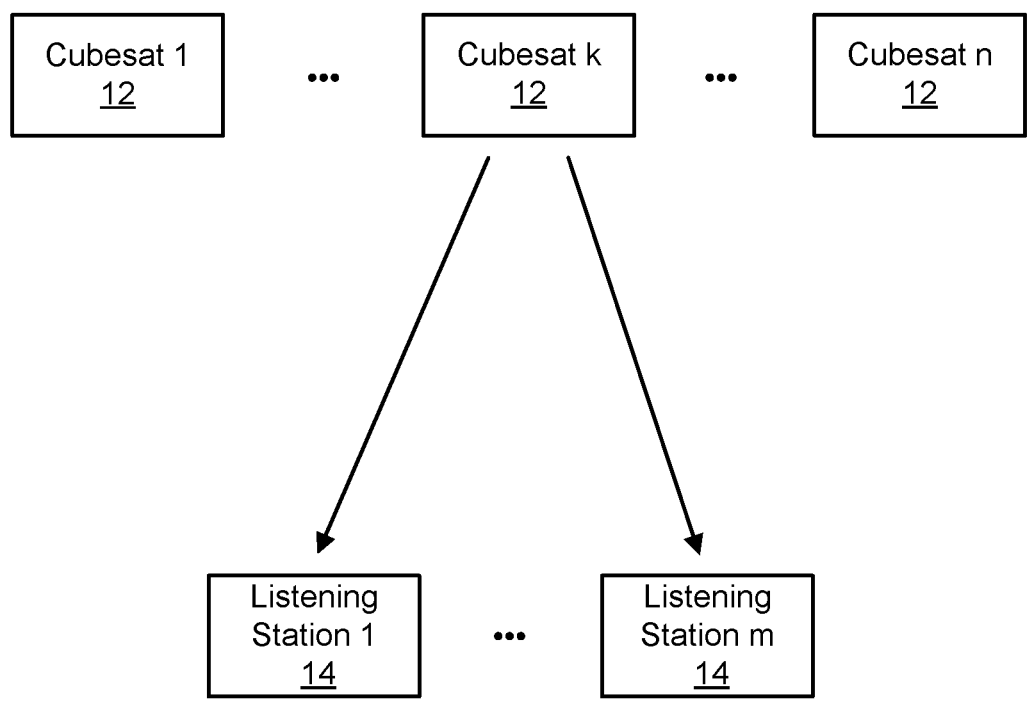
FIG. 3 shows the Cubesats sending to Listening Stations.

FIG. 3 shows a Cubesat k sends to all Listening Stations 14 in step 2 of the Individualistic Cubesat Protocol.

Proposition Individualistic Safety 2: If a supermajority of Listening Stations 14 are alert and have no imposters, then there will be at most one committed block for c for epoch e.

So, the net result of all this is that assuming that a supermajority of Listening Stations 14 is alert and have no imposters, there will be at most one committed block for epoch e.

Theorem Safety: If either the Cubesat c is alert and has no imposter or a supermajority of Listening Stations 14 are alert and have no imposters, then there will be at most one committed block produced for Cubesat c in epoch e.

Figure 4:
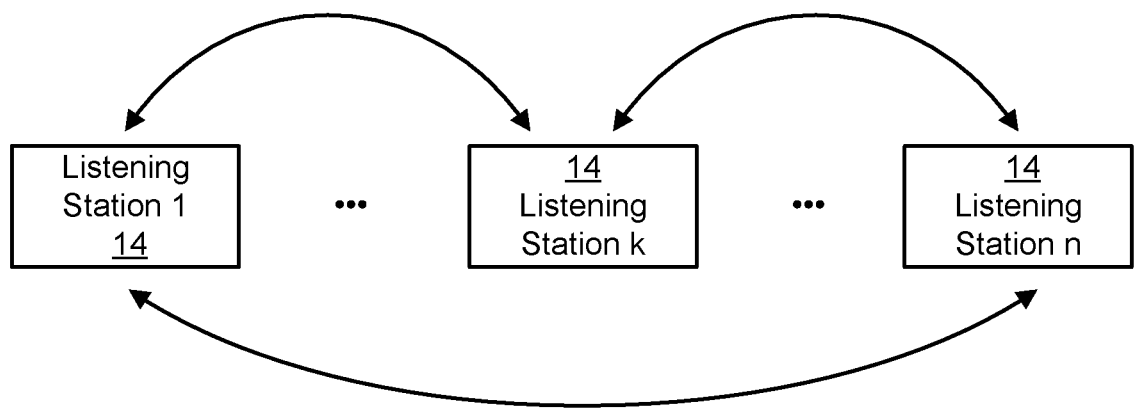
FIG. 4 shows the Listening Stations exchanging messages (gossipping) among themselves.

FIG. 4 shows Listening Stations 14 gossip together about the block from Cubesat c in the Individualistic Cubesat Protocol.

One might ask what the benefit is of the Cubesat 12 architecture. The answer is that safety is maintained even with more than ⅓ failed Listening Stations 14 in the very likely case that the Cubesat 12 is alert and has no imposters.

Moreover, some assurances can be made about liveness.

Proposition Individualistic Liveness: If (i) c is fail-stop, has no imposter, and has send-to-all capability (ii) a supermajority of Listening Stations 14 are alert and have no imposters and (iii) all alert Listening Stations 14 have send-to-all capability, then $sgn_c block(c,e)$ will be committed.

Remark: As written, the algorithm requires each Cubesat 12 to send its block at a particular time, but, alternatively, Listening Stations 14 or Sending Stations 16 could request a Cubesat 12 to send at some given time and give the Cubesat 12 only a certain amount of time to respond.

Individualistic Cubesat Protocol: the Merkle Tree Root Variant

This protocol is essentially identical to the Individualistic Cubesat Protocol, except that the Cubesats 12 receive only signed hashes of the Merkle Trees that characterize each block. The Cubesats 12 do not receive transactions. This describes one extreme of minimal communication from the Sending Stations 16 to the Cubesats 12. Another extreme would be to send all transactions as in the first protocol, but design points in between are of course possible, e.g. some signed portion of the Merkle tree and some transactions.

The goal is to send some "representation" of the transactions (e.g. the transactions themselves, the root of the Merkle tree of a block, or some combination of digests and transaction content) with the property that once a Cubesat 12 signs this representation, any third party can test whether a claimed block conforms to the representation or not. For example, suppose the sending station 16 sends the hash h(Merkroot(b)) of the root of the Merkle tree for a block b and a Cubesat 12 signed it. Suppose further that some agent claims that the block b had a certain sequence of transactions t1, ... tk where t1 was the hash of the root of the Merkle tree of the previous block.

An observer could construct the Merkle tree for t1, ... tk, hash the root with hash function h, and see whether the result agreed with h(Merkroot(b)).

The Merkle Tree characterizing a block of transactions is a hierarchical structure with the property that each parent node contains a hard-to-invert hash of its children nodes. This ensures that if an agent has possession of the hash of the root of a Merkle tree and some other agent manipulates any node of the tree, then the hash of the root will differ with overwhelming probability.

In practice, this will mean that the Sending Station 16 can construct some block b (which will include the hash of the root of the Merkle Tree of the previous block), create the Merkle Tree for the block b, and then sign and send to some Cubesat c just the hash of the Merkle Tree of block b. The Cubesat c will sign just that signed hash of the root.

The benefit of this embodiment is that the performance of the protocol no longer depends on the bandwidth of the Cubesats 12 but rather on the performance of the Listening Stations 14.

As in the initial Individualistic Cubesat Protocol, time is divided into epochs. So, in an epoch, every alert Cubesat 12 sends its signed hash of the root of a Merkle Tree.

1. All-Cubesat Step.
    Set-Up Phase.
    (As in the previous protocol.) The Cubesats 12 will send in turn. In the simplest case, each Cubesat c that has been validated in the lift-off protocol will be assigned time slice slice(c) within each "epoch" e. If there are k Cubesats, then each one is allotted a slice equal to 1/kth of the epoch.
    (ii) (As in the previous protocol.) A user u wishing to send a transaction T in epoch e signs (T,e) and sends $sgn_u((T,e))$ to some Sending Stations with a good reputation.
    (iii) (Changed from the previous protocol.) Sending Station s in communication with Cubesat c works as follows: gathers a block of transactions it has received and have not been committed, the root of the Merkle tree up the last block (i.e. the cubesat 12 having the slice before c's), and then signs and sends just the hash of the root of this Merkle tree to c, i.e. $sgn_s(root_e)$. In what follows, this is called block(c,e). Over time, a Sending Station may send to several cubesats 12 and a cubesat 12 could receive from several Sending Stations 16. But in an epoch, only one Sending Station 16 will send to one cubesat 12. The relevant Sending Station 16 for that epoch will then send its entire Merkle tree to all Listening Stations 14. The Listening Stations 14 can validate the internal consistency of the Merkle tree and can later match the root against the signed root from the cubesat 12 for this epoch.
    (iv) (Changed from previous protocol) At epoch e, Cubesat c creates, signs, and sends a block $sgn_c$ (block(c,e)) containing the hash of the Merkle root that c has received for epoch e.

Listening Stations 14 match the signed root hash against the Merkle Tree they have received from epoch e's Sending Station. If L receives inconsistencies, then L reports the Sending Station to the special debugging stations along with the evidence.

2. (As in previous protocol) Listening station 14 Block Gossip Phase: Provided Listening Station L has received a single block $sgn_c(block(c,e))$ from Cubesat c (and not different signed blocks from c), L sends to all other Listening Stations 14 a digest of $sgn_c(block(c,e))$, i.e. $\text{sgn}_L(\text{digest}(\text{sgn}_c\text{block}(c,e)))$. If L receives inconsistencies from c, then L reports c to special debugging stations along with the evidence.

3. Listening station 14 Committing Phase: If Listening Station L' receives messages of the form $\text{sgn}_L(\text{digest}(\text{sgn}_c\text{block}(c,e)))$ from Listening Station L and does so from a supermajority of Listening Stations 14 (including L' itself), and does not receive any conflicting digest of a block signed by c,t, then L' creates a committed block, denoted committed(c,e) consisting of $\text{sgn}_c(\text{block}(c,e))$ and the digest messages from a supermajority of Listening Stations 14.

That block becomes part of the blockchain and is shared with the Sending Stations 16. Otherwise, L' shares $\text{sgn}_{L'}$ (insufficient(digest($\text{sgn}_c\text{block}(c,e)$))).

Individualistic Cubesat Protocol: the Merkle Tree Root Variant under the Trust-the-Cubesat 12 assumption This protocol is based on the Individualistic Cubesat Protocol with the Merkle Tree Root variant, except that the Cubesats 12 are assumed to be trustworthy and have no imposters (a likely situation given the liftoff setup). In such a case, there is no need for a Practical Byzantine Fault Tolerance Protocol.

As in the Merkle Tree Root variant, a Sending Station will sign and send some "representation" of the transactions (e.g. the transactions themselves, the root of the Merkle tree of a block, or some combination of digests and transaction content) with the property that once a Cubesat 12 signs this representation, any third party can test whether a claimed block conforms to the representation or not. The Cubesat c will sign just that representation.

As above, time is divided into epochs. So, in an epoch, every alert Cubesat 12 sends its signed hash of the root of a Merkle Tree.

In what follows "the previous protocol" refers to the Individualistic Cubesat Protocol: the Merkle Tree Root Variant.

1. All-Cubesat Step.
    Set-Up Phase.
    (As in the previous protocol.) The Cubesats 12 will send in turn. In the simplest case, each Cubesat c that has been validated in the lift-off protocol will be assigned time slice slice(c) within each "epoch" e. If there are k Cubesats 12, then each one is allotted a slice equal to 1/kth of the epoch.
    (ii) (As in the previous protocol.) A user u wishing to send a transaction T in epoch e signs (T,e) and sends $\text{sgn}_u((T,e))$ to some Sending Station s with a good reputation.
    (iii) (As the previous protocol.) Sending Station s in communication with cubesat c works as follows: gathers a block of transactions it has received and have not been committed the root of the root of the Merkle tree up the last block (i.e. the cubesat 12 having the slice before c's), and then signs and sends just the hash of the root of this Merkle tree to c, i.e. $\text{sgn}_s(\text{root}_e)$. In what follows, this is called block(c,e). Over time, a Sending Station may send to several cubesats 12 and a cubesat 12 could receive from several Sending Stations 16. But in an epoch, only one Sending Station 16 will send to one cubesat 12. The relevant Sending Station 16 for that epoch will then send its entire Merkle tree to all Listening Stations 14. The Listening Stations 14 can validate the internal consistency of the Merkle tree and can later match the root against the signed root from the cubesat 12 for this epoch.
    (iv) (Modified from the previous protocol) At epoch e, Cubesat c creates, signs, and sends a block $\text{sgn}_c(\text{block}(c,e))$ containing the Merkle root that c has received for epoch e. Listening Stations 14 match the signed root against the Merkle Tree they have received from epoch e's Sending Station. If L receives inconsistencies, then L reports the Sending Station to the special debugging stations along with the evidence. Otherwise, L can commit that block which becomes part of the blockchain and is shared with the Sending Stations 16.

In this "trusting protocol," it is assumed the cubesat 12 is correct and so any block whose Merkle root or other representation that is signed by the cubesat 12 is considered valid. That is, the cubesat 12 will behave properly and there will be no imposters. This eliminates the need for a gossiping phase among Listening Stations.

If a block agrees with the representation that has been signed by the cubesat 12, then any Listening station 14 can add it to the blockchain.

Rotating Special Cubesat Protocol

The above individualistic protocol family much to recommend it: (i) the Cubesat 12 portion of the protocol is very simple, facilitating a correct implementation. (ii) adding a Cubesat 12 doesn't change the protocol of any other Cubesat 12 except perhaps when it must execute.

However, it suffers a scalability problem because the Listening Stations 14 must gossip for every Cubesat 12, making it possible that the Listening Stations 14 could become a bottleneck. For that reason, another protocol is offered in which each Cubesat 12 sends its blocks to all Listening Stations 14 as in the Individualistic protocol, but the Listening Stations 14 gossip only once per epoch.

Specifically, the following Rotating Special Cubesat Protocol is meant to produce a single superblock consisting of the blocks of all Cubesats 12 at the end of every epoch. Like the Individualistic Cubesat Protocol, the Rotating Special Cubesat Protocol is safe in all but the most dire and socio-technically unlikely failure scenarios and is live in many as well. In fact, it can even compensate for certain inconsistencies among traitorous Cubesats 12. For this protocol, a few additional definitions are needed.

Definition: An epoch is a fixed time period over which all the Cubesats 12 report their results to the Listening Stations 14 and the Listening Stations 14 may or may not produce a superblock.

Remark: The previous definition of epoch also entailed a time period when every Cubesat 12 sends its block, but there was no notion of superblock.

1. All-Cubesat Step.
    Set-Up Phase. (i) A user u wishing to send a transaction T in epoch e signs (T,e) and sends $\text{sgn}_u((T,e))$ to some Sending Station s with a good reputation.
    (ii) Sending Station s signs and sends $\text{sgn}_s(\text{sgn}_u((T,e)))$ (perhaps along with other transactions) to any Cubesat 12 validated in the lift-off protocol.
    (iii) In an epoch e, every Cubesat c that has been validated in the lift-off protocol will be assigned time slice slice(c) within e. If there are k Cubesats, then each one is allotted a slice equal to 1/kth of the epoch.
    (iv) At slice(c), Cubesat c creates and signs a block block(c,e) containing the transactions that c has received for epoch e.

2. Cubesat Sending Phase. c sends $\text{sgn}_c(\text{block}(c,e))$ to all Listening Stations 14. c also sends a signed hash digest of $\text{sgn}_c(\text{digest}(\text{block}(c,e)))$ to Cubesat $s_e$, the special Cubesat 12 designated for epoch e. Note that this is minimal extra traffic for $s_e$. See figure FIG. 5.

3. Listening station Block Gossip Phase: Each Listening Station L sends to all other Listening Stations 14 all the signed blocks that L has received (which may include blocks from several distinct messages from some Cubesat f if f is traitorous or has imposters; in this case L will also report the evidence against f to a special debugging station). See figure FIG. 6.

4. Listening station 14 Upload Phase. Each Listening Station L signs and sends to $s_e$ the digests of blocks that L has received either initially or in the Listening station 14 Gossip Phase. See figure FIG. 7.

5. Superdigest Formulation Phase. $s_e$ identifies the set of blocks B that have the following properties: (i) B contains the block from $s_e$, block($s_e$). (ii) Let M be a set of Listening Stations 14 that constitutes a supermajority of the Listening Stations 14 and such that every Listening station 14 in M includes a digest of block($s_e$). (iii) B contains every other block b such that b is sent in the digest of every Listening station 14 in M. and (iv) The digests that $s_e$ had received and that the Listening Stations 14 in M send are the same for blocks in B.

Special Cubesat $s_e$ then creates a collection of digests called superdigest(e) consisting of the digests for the blocks in B. If the result is the empty set, then $s_e$ creates a superdigest(e) consisting of block($s_e$) alone. As a failure diagnosis, $s_e$ also sends all the Listening station 14 digests to special debugging stations if there are inconsistencies in those digests.

6. Superdigest Sending Phase. $s_e$ signs and sends $sgn_{se}$(superdigest(e)) to all Listening Stations 14. See FIG. 8.

7. Listening station 14 Superdigest Gossip Phase: Each Listening Station L that receives a single $sgn_{se}$(superdigest(e)) from $s_e$ (i.e., L does not receive inconsistent superdigests signed by $s_e$ which could happen if s, had an imposter or $s_e$ had failed traitorously) and that has received all the blocks of superdigest(e) sends $sgn_L$ ($sgn_{se}$(superdigest(e))) to all other Listening Stations 14. If L does receive inconsistent superdigests signed by $s_e$, then L can send $sgn_{se}$(inconsistent(e)) along with evidence of inconsistency (viz. the different superdigests signed by $s_e$). It also shares this inconsistency with the debugging stations.

8. Superblock Formulation Phase. If a Listening Station L' receives "supermajority support", i.e., the same (superdigest(e))) from a supermajority of other Listening Stations 14 (including itself), then L' publishes (i) ($sgn_{se}$(superdigest(e))), (ii) all the $sgn_L$($sgn_{se}$(superdigest(e))) that L' has received and (iii) all the blocks corresponding to (superdigest(e))). Altogether, this constitutes a superblock, superblock$_{L'}$(e). By contrast if Listening Station L' receives at least two inconsistent ($sgn_{se}$(superdigest(e))), then L' asserts inconsistency$_{L'}$(e) and sends evidence of the inconsistency to the special debugging stations. Otherwise, if Listening Station L' receives consistent superdigests but from less than a supermajority of all Listening Stations 14, then L' asserts insufficient$_L$(e).

Figure 5:
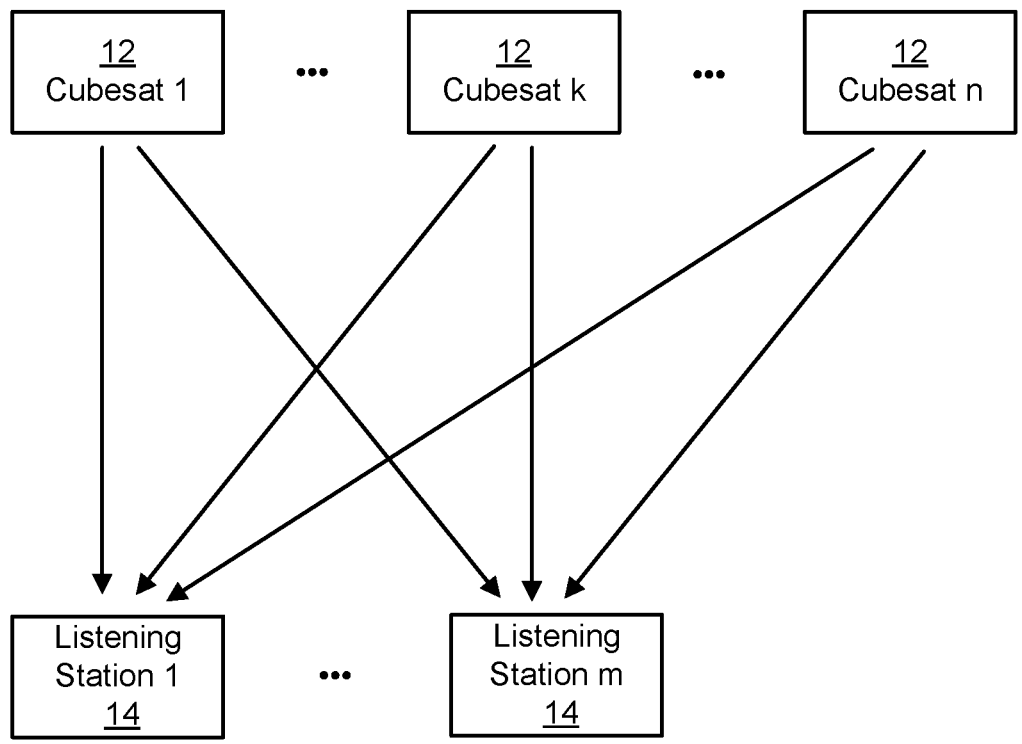
FIG. 5 shows the Cubesats sending information to Listening Stations and also to the special Cubesat (k, in this case) of this epoch.

In regard to FIG. 5, for a given epoch e suppose that Cubesat k is the special Cubesat for e ($s_e$ in the text). All Cubesats send to Cubesat k as well as to the Listening Stations 14 in step 2 of the Rotating Special Cubesat Protocol.

Proposition Rotating Safety 1: If $s_e$ is fail-stop and has no imposter, then the Rotating Special Cubesat Protocol can produce at most one superdigest(e) signed by $s_e$.

Therefore, there will be at most one superblock for epoch e.

Remark: The reason to change which Cubesat 12 is special in different epochs is that if only a subset of the Cubesats 12 are traitorous' or are imposters and a supermajority of Listening Stations 14 behave properly, at least some epochs will yield non-empty superblocks.

Figure 6:
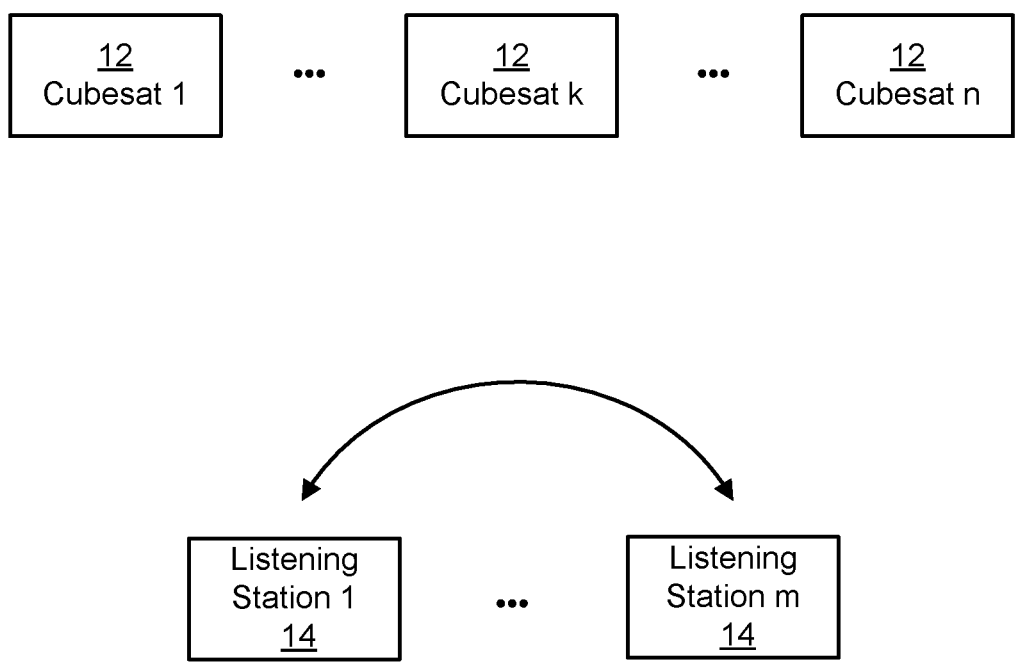
FIG. 6 shows a message exchange (gossip) phase among the Listening Stations.

FIG. 6: In step 3, step 7, and step 8 of the Rotating Special Cubesat Protocol, there is a gossip phase among Listening Stations 14.

As for the Individualistic protocol, if $s_e$ fails traitorously or has an imposter, a supermajority of the Listening Stations 14 can still prevent inconsistent superblocks.

Proposition Rotating Safety 2: If a supermajority of Listening Stations 14 are alert and have no imposters, then there will be at most one superblock for epoch e in the Rotating Special Cubesat Protocol.

As for the Individualistic Cubesat Protocol, the net result of all this is that assuming that a supermajority of Listening Stations 14 is alert and have no imposters, there will be at most one superblock for epoch e.

Figure 7:
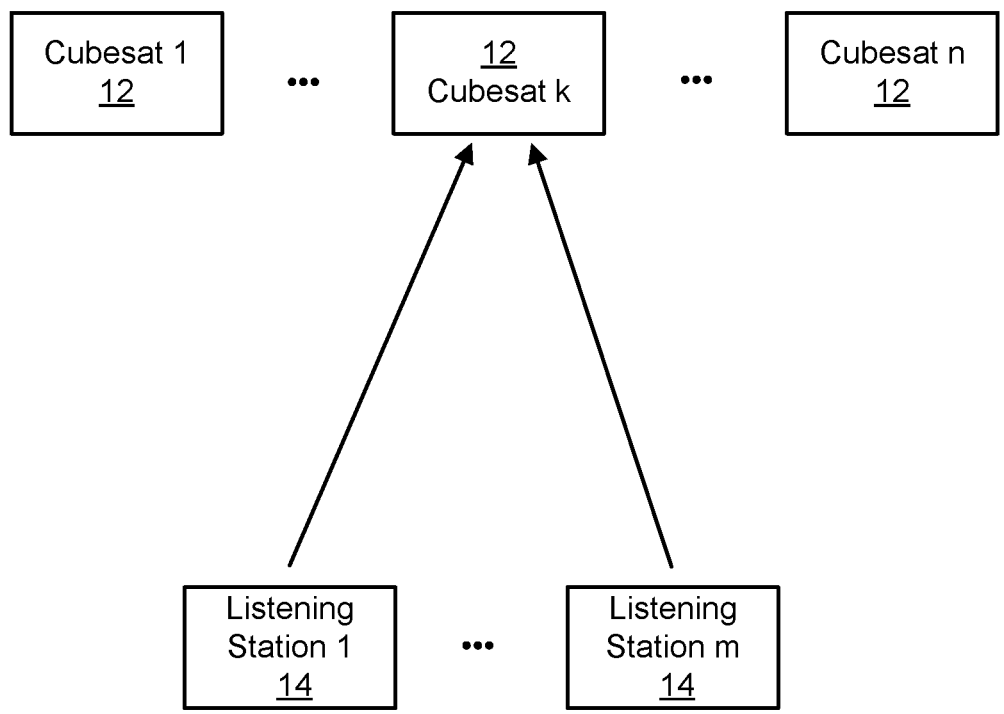
FIG. 7 shows Listening Stations sending information to the special Cubesat of this epoch.

FIG. 7: Listening Stations 14 send their digests to Cubesat k which is the special Cubesat 12 for epoch e in the Rotating Special Cubesat Protocol.

Theorem Rotating Safety: In the Rotating Special Cubesat Protocol, if either the special Cubesat 12 for epoch e is alert and has no imposter or a supermajority of Listening Stations 14 are alert and have no imposters, then there will be at most one superblock produced for epoch e.

As in the Individualistic Cubesat Protocol, this Rotating Special Cubesat Protocol maintains safety in the very likely case that the special Cubesat 12 is alert and has no imposters, even when more than ⅓ of the Listening Stations 14 have failed traitorously. This is a benefit beyond what is offered in other Practical Byzantine Fault Tolerant algorithms like the Redundant Byzantaine Fault Tolerant Protocol (RBFT). Also, as in the Individualistic Cubesat Protocol, the protocol can be modified by having each Sending Station send to only one Cubesat and, instead of sending an entire block, send some representation of a block (e.g. the hash of the root of the Merkle Tree of the block) to that one Cubesat 12.

Liveness for the Rotating Special Cubesat Protocol

Figure 8:
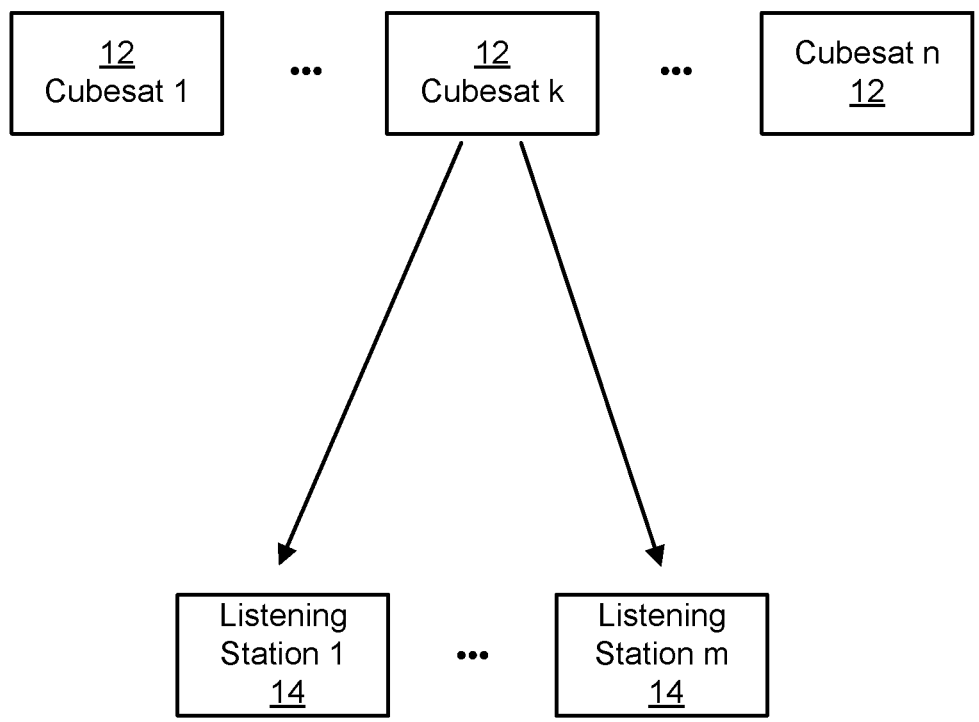
FIG. 8 shows the special Cubesat of a particular epoch sending information to all Listening Stations.

FIG. 8: The special Cubesat k sends the superdigest to all Listening Stations 14 in the Rotating Special Cubesat Protocol.

Proposition Rotating Liveness 1: If (i) $s_e$ is fail-stop, has no imposter, and has send-to-all capability (ii) a supermajority of Listening Stations 14 are alert and have no imposters and (iii) all alert Listening Stations 14 have send-to-all capability, then there will be a non-empty superdigest(e) signed by $s_e$ and that will be the exclusive superblock for epoch e.

Remark: Note that the protocol gives $s_e$ some leeway in choosing the blocks B because se can set M to any supermajority of the Listening Stations 14 that contain block($s_e$) and that send digests that are consistent with one another and consistent with what $s_e$ had received from the other Cubesats 12 in the Cubesat 12 Sending Phase. The reason this might be of interest is illustrated by the following example: suppose that the set M' of all Listening Stations 14 that had received block($s_e$) include a traitorous Listening station 14 that might claim to have received only block($s_e$). In that case, M to another supermajority that satisfies the properties above might want to be set. That would yield a larger superblock.

Proposition Rotating Liveness 2: If (i) $s_e$ is fail-stop, has no imposter, and has send-to-all capability (ii) a supermajority of Listening Stations 14 are alert and have no imposters and (iii) all alert Listening Stations 14 have send-to-all capability and (iv) all Listening Stations 14 are fail-stop, then there will be a non-empty superdigest(e) signed by $s_e$ that will be the superblock for epoch e and will contain at least every block that an alert Cubesat 12 has sent to at least one alert Listening station 14 in the Cubesat 12 sending phase.

Remark: The Listening station 14 Block Gossip Phase can be viewed as optional, because any alert Cubesat 12 can reach all Listening Stations 14 by the send-to-all assumption. However, pragmatically, the Listening station 14 Block Gossip Phase may help in the case that a traitorous or inept Cubesat 12 sends to only some of the Listening Stations 14. Then alert Listening Stations 14 in the Gossip Phase spread the information to all Listening Stations 14. Such a phase could also be an option in the Individualistic Cubesat Protocol.

Remark: Both of these protocols could have an added round in which blocks (in the Individualistic case) and superblocks (in the Rotating case) can be broadcast to all Listening Stations 14 and external client sites. If in the Individualistic protocol, a site s receives a committed block b for epoch e and slice i then s will replace any insufficient or inconsistent block for e and I by block b. Similarly, in the Rotating protocol, if site s receives a committed superblock x for epoch e, then s will put x in its chain at position e, replacing any insufficient or inconsistent superblock.

Remark: The Listening station 14 Block Gossip, the Listening station 14 Upload Phase, the Superdigest Formulation Phase are necessary to handle the case when Cubesats 12 other than the special Cubesat 12 may be traitorous. In such cases, when the special Cubesat 12 is alert, it can create a valid superblock even when other Cubesats are traitorous.

Added Guarantees for Exposure-Averse Traitorous Cubesats and Imposters

Because each message that a Cubesat 12 or Listening station 14 sends is signed, Listening Stations 14 can easily detect inconsistencies. Such a detection can then engender analysis by debugging stations followed by human actions such as shutdowns of Listening Stations 14 or changing Hardware Security Modules.

Below are some examples of the kinds of inconsistencies that could be found.
1. If Listening Station A includes block b in its message to L but does not include b in its message to L' in the Listening Station Block Gossip Phase, then L and L' together could demonstrate the inconsistency of A, because all of the messages of A are signed.
2. Analogously, if Cubesat A signs block b in its message to L but signs block b' in its message to L', then the L and L' can demonstrate the inconsistency of A or perhaps the existence of an imposter of A:

This capacity of catching inconsistencies will expose traitors quickly, sharply decreasing their incentive to act badly.

Definition: A device has exposure aversion if it seeks never to be caught sending conflicting signed messages that might arrive at a debugging station, because it doesn't want to be discovered to be traitorous. Similarly, an imposter i for device d is exposure-averse if it seeks to avoid causing debugging stations to observe inconsistent messages that are signed by the key of d.

One implication of exposure aversion is that traitorous devices or imposters will send messages that violate the protocol ("violating messages") only to traitorous Listening Stations 14.

The traitorous Listening Stations 14, in turn, will conspire never to reveal inconsistencies to any alert Listening station 14 that may then reveal the inconsistency to a debugging station.

Exposure Aversion Safety Proposition 1: If traitorous Cubesats and Cubesat imposters have exposure aversion, then they will never create inconsistent superblocks in the Rotating Special Cubesat Protocol unless there is at least a supermajority of traitorous Listening Stations 14.

The analogous guarantee holds for the Individualistic Cubesat Protocol family:

Exposure Aversion Safety Proposition 2: If traitorous Cubesats 12 and Cubesat imposters have exposure aversion, then they will never create an inconsistent block in the Individualistic Cubesat Protocol unless there is at least a supermajority of traitorous Listening Stations 14.

Broadcast when combined with exposure aversion narrows the scope of what traitorous Cubesats can do even more.

Definition: A device is broadcast-forced if each of its messages are sent to all Listening Stations 14.

Note that this is different from send-to-all capability where alert devices can send to all Listening Stations 14 but a traitorous device could decide not to send to all Listening Stations 14. Here every message that even a traitorous device sends goes to all Listening Stations 14.

Suppose that an exposure-averse traitorous device is broadcast-forced. In that case, it will never send conflicting signed messages if there could be even one alert Listening station 14, because that Listening station 14 would report the inconsistency to the debugging stations.

System-Level Attacks and Countermeasures

Consider attacks that do not entail attacking the Cubesats 12 or Listening Stations 14.
1. Denial of service attack: an enemy sends so many messages that they overwhelm the blockchain signer. Counter-measure: Sending Stations 16 require a payment to include a transaction.
2. An adversary takes over some number of Sending Stations 16? Counter-measure: This could have two consequences: (a) Such an adversary could suppress messages sent to those compromised Sending Stations 16. That might not reach the Cubesats 12 and so might not appear in a block. The user originating this transaction, upon recognizing this problem, could send them to different Sending Stations 16. (b) Such a Sending Station could refuse to validate a Cubesat 12 or give it a time slice as part of the lift-off procedure. Time slice assignment by majority (or super-majority) rule could be made.
3. A user double-spends. Counter-measure: While Bounce Blockchain itself is oblivious to the meaning of transactions, there can be integrator sites (which may be the Listening Stations 14) that provide a service saying what each user has in his or her account. Note that anyone can verify this by doing the (at worst linear time) calculation on the whole history. Incremental calculations are much cheaper.

Alternative Designs

Consider here various alternative designs and their advantages and disadvantages.

1. Place the guardians of the blockchain (whether implemented as hardware security modules or not) in a bunker and use armed guards to protect them, eliminating the need for satellites 12. It is thought satellites 12 are safer because it's much harder (at least now) to do anything other than destroy items in space (and that only by state actors), whereas a bunker would allow physical access. Further, because the value of tampering with the blockchain may be high, forcing or bribing terrestrial guards to allow entrance to intruders would be an ongoing concern, and tampering by the owner of the bunker would always be a concern. By contrast, validating the liftoff of one or more Cubesats 12 requires only one-time honesty, under highly transparent conditions. Further, the Cubesats 12 offer two levels of protection: as long as the Cubesats 12 are fail-stop without imposters, the Listening Stations 14 can't cause forks. Finally, paying for guards and other security might end up costing far more than launching and communicating with the Cubesats 12.

2. Proof of elapsed time based on the Intel SGX is a possible alternative. There, the idea is that the SGX runs trusted software that picks a random time and then wakes up. If that node is the first to wake up, then that node signs the next block. SGX has already suffered from its share of attacks [references Bruce Schneier 2017, 2018]. But even if those are fixed, there are others: potential hackers have proximate physical access to the hardware that is supposed to protect the priority of adding blocks to the blockchain. Subverting the scheme could entail changing the random time generator or potentially the time signal arriving at the machine or others.

3. The clever approach taken in [reference Dasu et al. 2018] is to posit reliable indicators (e.g. a cell tower) of location as a basic infrastructure. Given that, the idea is to have a hash of each block determine the reliable indicator for the next block. Given a reliable indicator I, the peer nearest to I determines the next block. The benefit is that there is no need for hash-mining. The main vulnerability is ensuring that no bad agent can spoof the key of a reliable indicator and thereby fork the chain.

4. In the introduction, the cost of the Bounce Blockchain protocol based on Cubesats 12 with the proof-of-work approach of Bitcoin is compared. What is lost in terms of security? Bounce Blockchain needs the Cubesat 12 and Listening station 14 public keys to be common knowledge. This information needs to be disseminated each time one or more Cubesats 12 is sent up. As mentioned above, the present need for trust is time-punctuated. By contrast, the need to trust agents on the permissionless Bitcoin-style blockchain is continuous:

(a) The manufacturer of mining boards could create a secret production run that can change the blockchain in arbitrary ways. As it is, a handful of mining sites control more than 50% of the mining capability of the BitCoin blockchain for example and the situation is worse for lesser crypto currencies [reference Roubini 2018] which have suffered forking attacks.

(b) An internet service provider could "eclipse" sites from seeing blocks or fooling miners to do useless work.

(c) A group of internet service providers could effectively partition the network, creating a fork even without an oligopoly of computational power.

Virtualization

Bounce Blockchain gives a total order of transactions. However, users may wish to build value-added blockchains (perhaps that offer more cryptographic protection, or are oriented towards particular applications) on top of Bounce Blockchain.

To build this, note that any sub-sequence of the total order could constitute one such value-added blockchain. One way to implement this would be to mark each transaction by the blockchain to which it belongs.

Summary

Bounce Blockchain is a conceptually simple technique to achieve higher performance than proof-of-work blockchains at far lower cost.

The protocol envisions one Hardware Security Module (HSM) incorporated into each of many Cubesats 12. Each HSM will sign a block of transactions during its slice of each epoch.

This protocol can ensure blockchain integrity for arbitary numbers of fail-stop Cubesats 12 and Listening Stations 14 provided there are no fail-traitorous devices or imposters. Even in the presence of fail-traitorous Cubesats 12 and imposters, the protocol can ensure safety provided a supermajority of Listening Stations 14 are alert and have no imposters. These guarantees are even stronger if traitorous devices are exposure-averse. In the likely scenario that Cubesats 12 are not traitorous, then the protocol can tolerate any number of traitorous Listening Stations 14 without allowing any forking.

Bounce Blockchain does not directly support features like smart contracts or absence of double-spending. Those can be handled by anyone who can inspect the blockchain.

The present invention pertains to a system 10 to prevent unauthorized users to determine the order of blocks in a blockchain. The system 10 comprises a plurality of satellites 12. The system 10 comprises a communications infrastructure in communication with the satellites 12. The system 10 comprises Sending Stations 16 in communication with the communications infrastructure. The system 10 comprises listening stations 14 in communication with the communications infrastructure. Some Sending Stations 16 and listening stations 14 may share some resources and in which at least one transaction is sent from a Sending Station 16 to a satellite 12, incorporated into a block by that satellite 12 and then sent to at least one listening station 14, and a communication protocol involving at least a plurality of listening stations 14 to determine the next block to put onto the blockchain without the need for proof of work or proof of stake.

The satellite 12 may digitally sign the block it sends to the at least one listening station 14. The communication protocol may include the sending of signed messages from one listening station 14 to another.

The present invention also pertains to a method to prevent unauthorized users to determine the order of blocks in a blockchain. The method comprises the steps of sending at least one transaction from one of the Sending Stations 16 through the communications infrastructure to a satellite 12 in communication with the communications infrastructure. There is the step of incorporating the one transaction into a block by the satellite 12. There is the step of sending the block to at least one listening station 14 of the listening stations 14. There is the step of using a communication protocol involving at least a plurality of the listening stations 14 to determine a next block to put onto the blockchain without the need for proof of work or proof of stake.

The embodiments above are representative but are not intended to be exhaustive or to limit the invention to the precise details of those embodiments. Modifications and variations are within the scope of this invention as determined by the appended claims when interpreted fairly and legally.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

REFERENCES, all of which are incorporated by reference, herein.

1. P. Aublin, S. B. Mokhtar, and V. Qu~A~lma. 2013. RBFT: Redundant Byzantine Fault Tolerance. (2013), 297-306. http://dx.doi.org/10.1109/ICDCS.2013.53 2. Miguel Castro and Barbara Liskov. 1999. Practical Byzantine Fault Tolerance. In Proceedings of the Third Symposium on Operating Systems Design and Implementation (OSDI '99). USENIX Association, Berkeley, Calif., USA, 173-186. http://dl.acm.org/citation.cfm?id=296806.296824
3. Jing Chen, Sergey Gorbunov, Silvio Micali, and Georgios Vlachos. 2018. ALGORAND AGREEMENT: Super Fast and Partition Resilient Byzantine Agreement. Cryptology ePrint Archive, Report 2018/377. https://eprint.iacr.org/2018/377, Vol. 1, No. 1, Article 1. Publication date: September 2018.
4. BROADBAND TV NEWS CORRESPONDENT. 2018. FSS satellite capacity pricing levels showing near-term stabilisation. https://www.broadbandtvnews.com/2018/05/02/fsssatellite-capacity-pricing-levels-showing-near-term-stabilisation/(2018), 1-1.
5. George Danezis and Sarah Meikeljohn. 2016. Centrally Banked Cryptocurrencies. In NDSS âĂŹ216, 21-24 Feb. 2016, San Diego, Calif., USA. https://arxiv.org/pdf/1505.06895.pdf
6. Tamraparni Dasu, Yaron Kanza, and Divesh Srivastava. 2018. Unchain your blockchain. In Proc. Symposium on Foundations and Applications of Blockchain.
7. Randall J Easter. 2006. Testing to FIPS 140-2 Derived Test Requirements. https://csrc.nist.gov/CSRC/media/Presentations/Testingto-FIPS-140-2-Derived-Test-Requirements/images-media/CMVP2606.pdf (2006).
8. Linux Foundation. 2017. Hyperledger Architecture, Volume 1: Introduction to Hyperledger Business Blockchain Design Philosophy and Consensus. https://www.hyperledger.org/wpcontent/uploads/2017/08/HyperledgerArchWGPaper1Consensus.pdf (2017), 1 15.
9. SpaceChain Foundation. 2018. SpaceChain White Paper. https://spacechain.com/wp-content/uploads/2018/09/SpaceChain-White-Paper.pdf (2018), 1-23.
10. Yan Michalevsky and Yonatan Winetraub. 2017. SpaceTEE: Secure and Tamper-Proof Computing in Space using CubeSats. https://arxiv.org/pdf/1710.01430.pdf (2017), 1-6.
11. Nouriel Roubini. 2018. Exploring the Cryptocurrency and Blockchain Ecosystem. (2018).
12. Bruce Schneier. 2017. Using Intel's SGX to Attack Itself. https://www.schneier.com/blog/archives/2017/03/using intels sg.html (2017).
13. Bruce Schneier. 2018. Speculation AttackAgainst Intel's SGX. https://www.schneier.com/blog/archives/2018/08/speculation att.html (2018).
14. Peter Smirnoff. 2017. Understanding Hardware Security Modules (HSMs). https://www.cryptomathic.com/news-events/blog/understanding-hardware-security-modules-hsms (2017).

APPENDIX: APPLICATIONS OF BOUNCE BLOCKCHAIN

Bounce Blockchain guarantees (under a wide variety of failure scenarios) that the committed blocks of transactions appear in a sequence. It does this at high speed and low energy and monetary cost.

As a result, Bounce Blockchain provides a platform upon which one can build any blockchain application. For example, the Hyperledger project (https://www.hyperledger.org/projects/fabric) requires that transactional blocks be arranged in a sequence. This is ensured by some trusted company (e.g. IBM) or consortium. However, if access to the underlying servers is insecure then forking (non-sequentiality) of blocks is possible. If instead, the sequentiality of the blocks were guaranteed by Bounce Blockchain, then the blocks would be maintained in a sequence. So, Bounce Blockchain could be a substrate for Hyperledger, for example. Bounce Blockchain could also be a substrate for cryptocurrencies such as BitCoin and Ethereum.

Because Bounce Blockchain is agnostic with respect to the meaning of the transactions, the transactions can embed smart contracts or other semantics. Whichever applications require such semantics (e.g. supply chain applications, insurance applications, and currency applications) can be built on top of Bounce Blockchain. Because adding blocks is so inexpensive in Bounce Blockchain, new applications such as credit card transactions would also be possible.

Concrete Application in More Detail According to One of the Preferred Embodiments This example will use the Individualistic Cubesat Protocol: the Merkle Tree Root Variant. A paradigmatic application of blockchains is to track the provenance of each of a collection of diamonds to ensure that each diamond d was legally mined and that diamond d has not been replaced by another along the way. Each time diamond d changes hands from one entity to the next (e.g. from the cutter to the distributor), it is photographed. The photograph as well as the transfer documents can be encoded into a transaction t.

Transaction t would be sent by either the sending entity, the receiving entity, or some intermediate agent to a Sending Station s (Step 1.*ii* of the protocol). Sending station s would assemble a block b containing transaction t at some epoch e, compute a Merkle Tree for block b, then sign the hash of the root of the Merkle Tree yielding a message sgns(hash(root (b)) (Step 1.*iii*) which it would then send to some Cubesat c, which is called block(c,e) in the protocol. At some later time, c would sign the message and then send it $sgn_c$(block (c,e)) to the Listening Stations 14 (step 1.*iv*).

The Listening Stations 14 would send signed messages among themselves in the Listening station 14 Block Gossip Phase (Step 2). If a supermajority (more than ⅔) of the Listening Stations 14 agree on the block, then block b becomes part of the block chain (Step 3).

What is claimed is:

1. A system to determine an order among blocks in a blockchain comprising:
at least one satellite;
a communications infrastructure in communication with the one satellite;

sending stations in communication with the communications infrastructure;

listening stations in communication with the communications infrastructure, wherein (i) a sending station of the plurality of sending stations assembles a block comprising of at least one transaction and a digest of all previous blocks and assembles a representation of the block; (ii) said sending station sends the representation of said block to said one satellite, (iii) said one satellite modifies said representation by an indication of an identity of said one satellite to form a modified representation and sends said modified representation to at least one listening station through the communications infrastructure (iv) said plurality of listening stations through the communications infrastructure engage in a protocol stored in each of the plurality of listening stations to ensure that said modified representation contains the indication of the satellite's identity, and said modified representation of said block and said block are in agreement, the communication protocol includes the sending of messages signed by the listening stations from one listening station to another.

2. The system of claim 1 wherein the indication of the identify of said one satellite includes the digital signature of said satellite.

3. The system of claim 1 wherein the satellite digitally signs the representation of the block the satellite sends to the at least one listening station.

4. A system to ensure that there is only one superblock per epoch involving a plurality of satellites, a communications infrastructure, Sending Stations, and Listening Stations, where some Sending Stations and Listening Stations may share some resources and wherein
  (i) at least one Sending Station sends at least one transaction to at least one satellite S1;
  (ii) said satellite S1 accumulates one or more transactions into a block b1;
  (iii) said satellite S1 signs and sends said block b1 to at least one Listening Station L1;
  (iv) said satellite S1 signs and sends a digest of said block b1 to at least one other satellite S2; and
  (v) said listening Station L1 sends information about the blocks it has received to at least one other Listening Station L2.

5. The system of claim 4 wherein said other satellite S2 accumulates information about blocks from a plurality of satellites in the system.

6. The system of claim 4 wherein at least one Listening Stations M1 sends information about the blocks M1 has received to satellite S2.

7. The system of claim 6 wherein satellite S2 sends information to at least one Listening Station concerning information it has received from at least one other Listening Station.

8. The system of claim 4 wherein the satellite S1 sends block information to several Listening Stations through a communications facility.

9. The system of claim 4 wherein the signing element in each satellite S1 is at least one of tamper-responsive or temper-resistant.

10. The system of claim 4 wherein if a supermajority of Listening Stations are alert and have no imposters during an epoch e, then there will be at most one superblock for epoch e.

11. The system of claim 4 wherein if a special Cubesat se of epoch e is fail-stop and has no imposter, then there will be at most one superblock for epoch e.

12. The system of claim 4 wherein if a special Cubesat se of epoch e is fail-stop and has no imposter, and has send-to-all capability (ii) a supermajority of Listening Stations are alert and have no imposters and (iii) all alert Listening Stations have send-to-all capability, then there will be a non-empty superdigest for epoch e signed by se.

13. The system of claim 4 wherein if a special Cubesat se of epoch e is fail-stop and has no imposter, and has send-to-all capability (ii) a supermajority of Listening Stations are alert and have no imposters, (iii) all alert Listening Stations have send-to-all capability and (iv) all Listening Stations are fail-stop, then there will be a non-empty superdigest signed by se that will be the superblock for epoch e and will contain at least every block that an alert Cubesat has sent to at least one alert Listening Station in the Cubesat sending phase.

14. The system of claim 4 wherein if a special Cubesat se of epoch e may fail in a traitorous way or have an imposter, but a supermajority of Listening Stations are alert, have no imposters, and have send-to-all capability, then at most one superblock will be produced in that epoch.

15. The system of claim 4 wherein if a Cubesat sends two inconsistent signed messages to different alert Listening Stations, then the inconsistency will be detected.

16. A system to ensure that there is only one superblock per epoch involving a plurality of satellites, a communications infrastructure, Sending Stations, and Listening Stations, where some Sending Stations and Listening Stations may share some resources and wherein
  (i) at least one Sending Station sends at least one transaction to at least one satellite S1;
  (ii) said satellite S1 accumulates one or more transactions into a block b1;
  (iii) said satellite S1 signs and sends said block b1 to at least one Listening Station L1;
  (iv) said satellite S1 signs and sends a digest of said block b1 to at least one other satellite S2; and
  (v) said satellite S1 sends block information to several Listening Stations through a communications facility.

17. A system to ensure that there is only one superblock per epoch involving a plurality of satellites, a communications infrastructure, Sending Stations, and Listening Stations, where some Sending Stations and Listening Stations may share some resources and wherein
  (i) at least one Sending Station sends at least one transaction to at least one satellite S1;
  (ii) said satellite S1 accumulates one or more transactions into a block b1;
  (iii) said satellite S1 signs and sends said block b1 to at least one Listening Station L1;
  (iv) said satellite S1 signs and sends a digest of said block b1 to at least one other satellite S2; and
  (v) each satellite S1 has a signing element, said signing element in each satellite S1 is at least one of tamper-responsive or temper-resistant.

18. A system to ensure that there is only one superblock per epoch involving a plurality of satellites, a communications infrastructure, Sending Stations, and Listening Stations, where some Sending Stations and Listening Stations may share some resources and wherein
  (i) at least one Sending Station sends at least one transaction to at least one satellite S1;
  (ii) said satellite S1 accumulates one or more transactions into a block b1;
  (iii) said satellite S1 signs and sends said block b1 to at least one Listening Station L1
  (iv) said satellite S1 signs and sends a digest of said block b1 to at least one other satellite S2; and (v) wherein if a supermajority of Listening Stations are alert and have no imposters during an epoch e, then there will be at most one superblock for epoch e.

19. A system to ensure that there is only one superblock per epoch involving a plurality of satellites, a communications infrastructure, Sending Stations, and Listening Stations, where some Sending Stations and Listening Stations may share some resources and wherein
   (i) at least one Sending Station sends at least one transaction to at least one satellite S1;
   (ii) said satellite S1 accumulates one or more transactions into a block b1;
   (iii) said satellite S1 signs and sends said block b1 to at least one Listening Station L1;
   (iv) said satellite S1 signs and sends a digest of said block b1 to at least one other satellite S2; and
   (v) wherein if a special Cubesat se of epoch e is fail-stop and has no imposter, then there will be at most one superblock for epoch e.

20. A system to ensure that there is only one superblock per epoch involving a plurality of satellites, a communications infrastructure, Sending Stations, and Listening Stations, where some Sending Stations and Listening Stations may share some resources and wherein
   (i) at least one Sending Station sends at least one transaction to at least one satellite S1;
   (ii) said satellite S1 accumulates one or more transactions into a block b1;
   (iii) said satellite S1 signs and sends said block b1 to at least one Listening Station L1;
   (iv) said satellite S1 signs and sends a digest of said block b1 to at least one other satellite S2; and
   (v) if a special Cubesat se of epoch e is fail-stop and has no imposter, and has send-to-all capability, a supermajority of Listening Stations are alert and have no imposters and all alert Listening Stations have send-to-all capability, then there will be a non-empty superdigest for epoch e signed by se.

21. A system to ensure that there is only one superblock per epoch involving a plurality of satellites, a communications infrastructure, Sending Stations, and Listening Stations, where some Sending Stations and Listening Stations may share some resources and wherein
   (i) at least one Sending Station sends at least one transaction to at least one satellite S1;
   (ii) said satellite S1 accumulates one or more transactions into a block b1;
   (iii) said satellite S1 signs and sends said block b1 to at least one Listening Station L1;
   (iv) said satellite S1 signs and sends a digest of said block b1 to at least one other satellite S2; and
   (v) wherein if a special Cubesat se of epoch e is fail-stop and has no imposter, and has send-to-all capability, a supermajority of Listening Stations are alert and have no imposters, all alert Listening Stations have send-to-all capability and all Listening Stations are fail-stop, then there will be a non-empty superdigest signed by se that will he the superbloek for epoch e and will contain at least every block that an alert Cubesat has sent to at least one alert Listening Station in the Cubesat sending phase.

22. A system to ensure that there is only one superblock per epoch involving a plurality of satellites, a communications infrastructure. Sending Stations, and Listening Stations, where some Sending Stations and Listening Stations may share some resources and wherein
   (i) at least one Sending Station sends at least one transaction to at least one satellite S1;
   (ii) said satellite S1 accumulates one or more transactions into a block b1;
   (iii) said satellite S1 signs and sends said block b1 to at least one Listening Station L1;
   (iv) said satellite S1 signs and sends a digest of said block b1 to at least one other satellite S2; and
   (v) if a special Cubesat se of epoch e may fail in a traitorous way or have an imposter, but a supermajority of Listening Stations are alert, have no imposters, and have send-to-all capability, then at most one superblock will be produced in that epoch e.

23. A system to ensure that there is only one superblock per epoch involving a plurality of satellites, a communications infrastructure, Sending Stations, and Listening Stations, where some Sending Stations and Listening Stations may share some resources and wherein
   (i) at least one Sending Station sends at least one transaction to at least one satellite S1;
   (ii) said satellite S1 accumulates one or more transactions into a block b1;
   (iii) said satellite S1 signs and sends said block b1 to at least one Listening Station L1;
   (iv) said satellite S1 signs and sends a digest of said block b1 to at least one other satellite S2; and
   (v) if a Cubesat sends two inconsistent signed messages to different alert Listening Stations, then an inconsistency regarding the two inconsistent signed messages will be detected.

* * * * *